United States Patent
Langmacher et al.

(10) Patent No.: US 7,594,180 B1
(45) Date of Patent: Sep. 22, 2009

(54) METHOD AND APPARATUS FOR TITLING BY PRESENTING COMPUTER-GENERATED CHARACTERS

(75) Inventors: Tom Langmacher, Washougal, WA (US); Mary E. Massey, Washougal, WA (US); David Howell, Scotts Valley, CA (US)

(73) Assignee: Apple Inc., Cupertino, CA (US)

( * ) Notice: Subject to any disclaimer, the term of this patent is extended or adjusted under 35 U.S.C. 154(b) by 356 days.

(21) Appl. No.: 10/842,581

(22) Filed: May 6, 2004

Related U.S. Application Data

(62) Division of application No. 10/231,371, filed on Aug. 28, 2002, now Pat. No. 7,199,805.

(60) Provisional application No. 60/383,140, filed on May 28, 2002.

(51) Int. Cl.
  G06F 3/00 (2006.01)
  G06F 13/14 (2006.01)
  G06T 13/00 (2006.01)

(52) U.S. Cl. ............ 715/762; 715/269; 715/270; 345/473; 345/619

(58) Field of Classification Search ........ 715/269, 715/240, 254, 256, 262, 268, 762–764, 270, 715/716, 726; 345/467–475, 636, 638, 619
See application file for complete search history.

(56) References Cited

U.S. PATENT DOCUMENTS

| | | | | |
|---|---|---|---|---|
| 4,953,225 A | | 8/1990 | Togawa et al. | |
| 5,179,649 A | * | 1/1993 | Masuzaki et al. | 715/507 |
| 5,182,709 A | | 1/1993 | Makus | |
| 5,359,712 A | * | 10/1994 | Cohen et al. | 715/723 |
| 5,435,564 A | * | 7/1995 | Kennedy et al. | 273/237 |
| 5,613,057 A | * | 3/1997 | Caravel | 715/500.1 |
| 5,636,340 A | * | 6/1997 | Bonneau et al. | 715/500 |
| 5,649,234 A | | 7/1997 | Klappert et al. | |
| 5,659,793 A | | 8/1997 | Escobar | |
| 5,692,117 A | * | 11/1997 | Berend et al. | 345/475 |
| 5,963,203 A | * | 10/1999 | Goldberg et al. | 715/723 |
| 5,966,691 A | | 10/1999 | Kibre et al. | |
| 5,999,195 A | * | 12/1999 | Santangeli | 345/473 |

(Continued)

FOREIGN PATENT DOCUMENTS

KR 2002023628 A 3/2002

OTHER PUBLICATIONS

Ken Stone, "Boris Calligraphy: Text Generators for Final Cut Pro 3 Title Creation and Animation with 'Title 3D' and 'Title Crawl'," Jan. 14, 2002.*

(Continued)

*Primary Examiner*—Tadeese Hailu
(74) *Attorney, Agent, or Firm*—Adeli & Tollen LLP

(57) ABSTRACT

Some embodiments of the invention provide a method for presenting computer-generated characters. The method defines several frames for a character and sequentially presents the frames. Each frame depicts a particular representation of the character. Also, at least two of the frames provide different representations of the character. Some embodiments provide a method for applying effects to computer-generated characters. This method applies an effect to the computer-generated characters by first generating an effect script. It then selects the generated effect script to apply to the computer-generated characters.

19 Claims, 17 Drawing Sheets

U.S. PATENT DOCUMENTS

| | | | |
|---|---|---|---|
| 6,118,455 | A | 9/2000 | Hidaka et al. |
| 6,184,879 | B1* | 2/2001 | Minemura et al. .......... 715/723 |
| 6,469,711 | B2* | 10/2002 | Foreman et al. ............ 715/723 |
| 6,504,545 | B1* | 1/2003 | Browne et al. .............. 345/473 |
| 6,512,522 | B1* | 1/2003 | Miller et al. ................ 345/474 |
| 6,744,422 | B1* | 6/2004 | Schillings et al. ........... 345/169 |
| 6,828,971 | B2* | 12/2004 | Uesaki et al. ................ 345/473 |
| 6,856,316 | B1* | 2/2005 | Browne et al. .............. 345/467 |
| 6,867,787 | B1 | 3/2005 | Shimizu et al. |
| 6,901,427 | B2* | 5/2005 | Teshima .................... 709/203 |
| 6,928,613 | B1* | 8/2005 | Ishii et al. ................... 715/726 |
| 6,947,044 | B1 | 9/2005 | Kulas |
| 6,956,574 | B1* | 10/2005 | Cailloux et al. ............ 345/473 |
| 7,009,611 | B2* | 3/2006 | Di Lelle .................... 345/467 |
| 7,035,463 | B1* | 4/2006 | Monobe et al. ............ 382/177 |
| 7,199,805 | B1 | 4/2007 | Langmacher et al. |
| 2002/0015050 | A1* | 2/2002 | Kawai et al. ................ 345/635 |
| 2002/0163498 | A1 | 11/2002 | Chang et al. |
| 2003/0002715 | A1 | 1/2003 | Kowald |
| 2006/0109975 | A1 | 5/2006 | Judkins et al. |
| 2007/0146388 | A1 | 6/2007 | Langmacher et al. |

OTHER PUBLICATIONS

Ken Stone, "TypeStyler and Final Cut Pro," Nov. 5, 2001.*
Ken Stone, "Using the Text Generators in FCP," Aug. 27, 2001.*
Ken Stone, "India Pro Special Effects Titler," Apr. 1, 2002.*
Ken Stone, "The Basics—Editing with Transitions in Final Cut Pro," Jun. 12, 2001.*
U.S. Appl. No. 10/231,371, filed Aug. 28, 2002, Langmacher, et al., Related Patent Application.
U.S. Appl. No. 10/840,894, filed May 6, 2004, Langmacher, et al., Related Patent Application.
Non-Final Office Action, filed Apr. 8, 2004, Langmacher, et al., U.S. Appl. No. 10/231,371.
Non-Final Office Action, filed Aug. 4, 2004, Langmacher, et al., U.S. Appl. No. 10/231,371.
Final Office Action, filed Jun. 14, 2005, Langmacher, et al., U.S. Appl. No. 10/231,371.
Non-Final Office Action, filed Dec. 27, 2005, Langmacher, et al., U.S. Appl. No. 10/231,371.
Non-Final Office Action, filed Jul. 26, 2006, Langmacher, et al., U.S. Appl. No. 10/840,894.
Final Office Action, filed Jun. 13, 2006, Langmacher, et al., U.S. Appl. No. 10/231,371.
Non-Final Office Action for U.S. Appl. No. 10/840,894, filed Sep. 11, 2007, Langmacher, et al., Non-Final Office Action of a Related U.S. Patent Application.
Notice of Allowance of U.S. Appl. No. 10/231,371, filed Nov. 21, 2006, Langmacher, et al., Notice of Allowance of a commonly owned U.S. Patent Application, which issued as US Patent 7,199,805.
Non-Final Office Action of U.S. Appl. No. 11/681,748, filed Oct. 29, 2007, Langmacher, et al., Non-Final Office Action of a commonly owned pending U.S. Patent Application.
Non-Final Office Action of U.S. Appl. No. 11/681,748, filed Jun. 23, 2008, Langmacher, et al., Non-Final Office Action of commonly owned U.S. Appl. No. 11/681,748, listed as item #4 in the 1449 dated May 23, 2008.
Notice of Allowance of U.S. Appl. No. 11/681,748, filed Oct. 7, 2008, Langmacher, et al., Notice of Allowance of commonly owned U.S. Appl. No. 11/681,748, listed as item #4 in the 1449 dated May 23, 2008.
Final Office Action of U.S. Appl. No. 10/840,894, filed Jul. 8, 2008, Langmacher, et al., Final Office Action of commonly owned U.S. Appl. No. 10/840,894, listed as item #4 in the 1449 date Nov. 10, 2006.
Final Office Action with Restriction Requirement of U.S. Appl. No. 10/840,894, filed Sep. 16, 2008, Langmacher, et al., Final Office Action with Restriction Requirement of commonly owned U.S. Appl. No. 10/840,894, listed as item #4 in the 1449 dated Nov. 10, 2006.
U.S. Appl. No. 10/840,894, filed May 6, 2004, Langmacher, et al., Final Office Action of a Related U.S. Patent Application (dated Jan. 24, 2007).
Advisory Action of U.S. Appl. No. 10/840,894, filed Dec. 3, 2008, Langmacher, et al., Advisory Action of commonly owned U.S. Appl. No. 10/840,894, listed ad item #4 in the 1449 dated Nov. 10, 2006.

* cited by examiner

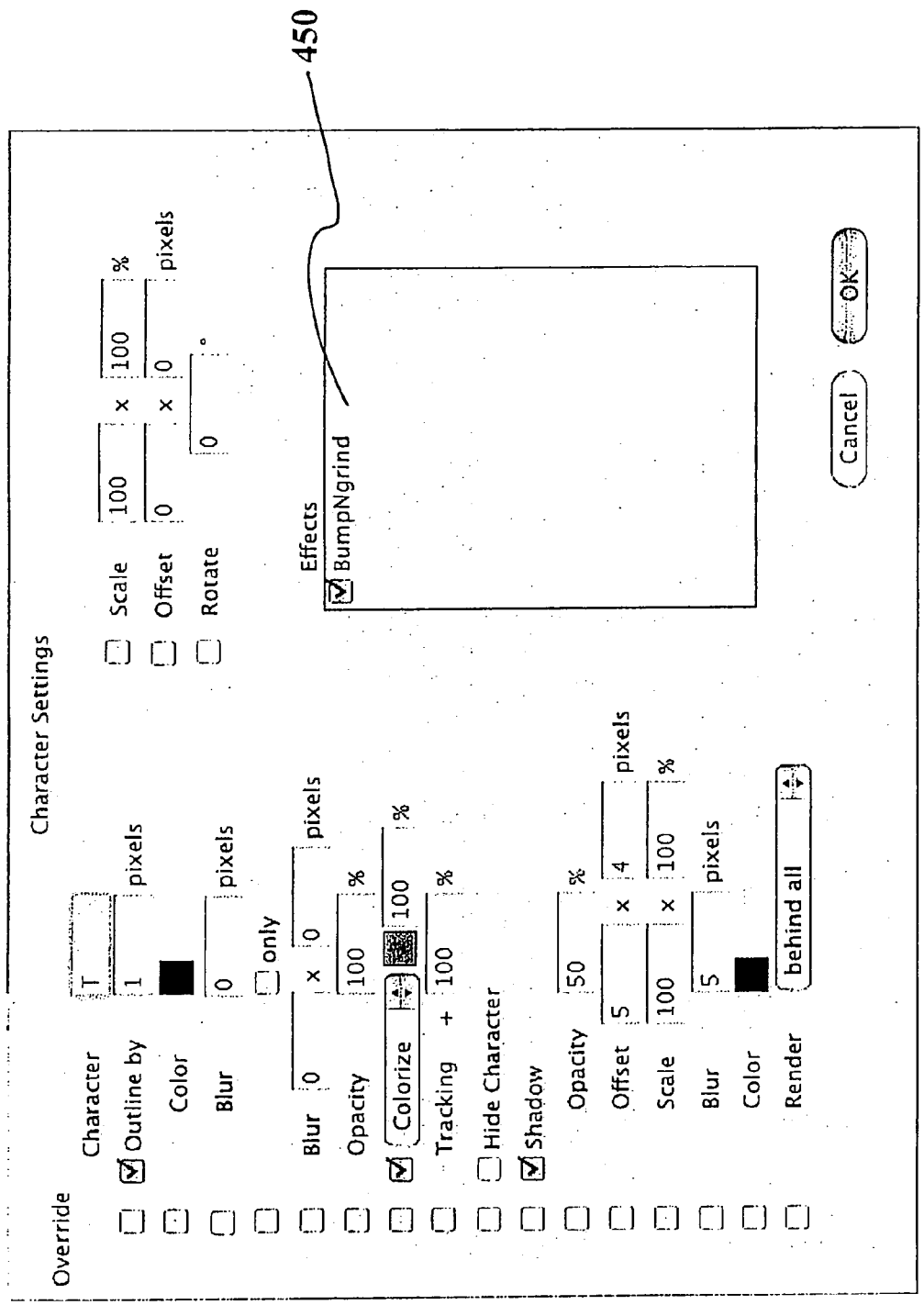

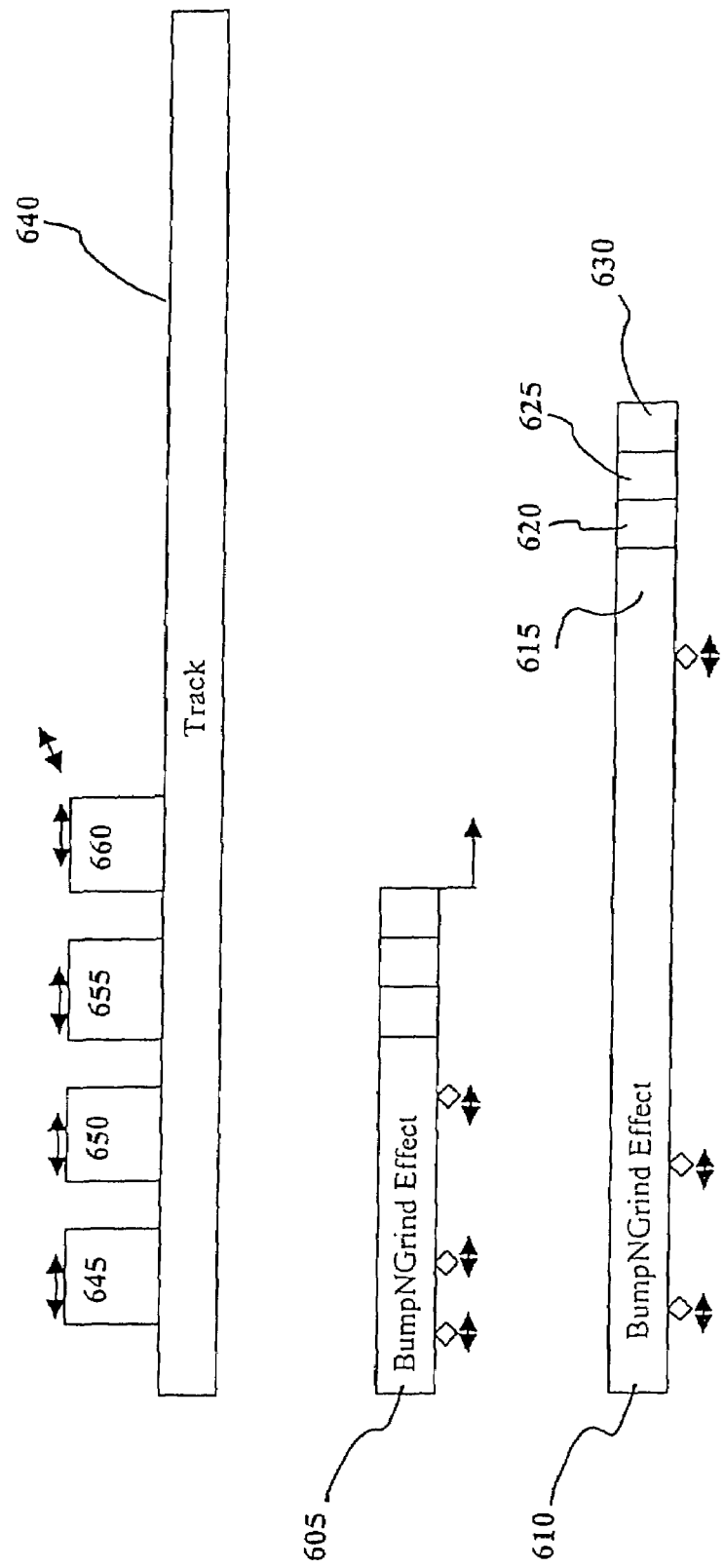

METHOD AND APPARATUS FOR TITLING BY PRESENTING COMPUTER-GENERATED CHARACTERS

CROSS REFERENCE TO RELATED APPLICATIONS

This Application is a divisional application of U.S. patent application Ser. No. 10/231,371, filed Aug. 28, 2002, which claims priority to U.S. Provisional Patent Application 60/383,140, filed May 28, 2002. U.S. patent application Ser. No. 10/231,371 issued as U.S. Pat. No. 7,199,805 on Apr. 3, 2007. This application is related to U.S. patent application Ser. No. 10/840,894, filed May 6, 2004, which is a divisional application of U.S. patent application Ser. No. 10/231,371. This application is also related to U.S. patent application Ser. No. 11/681,748, filed Mar. 2, 2007, which is a continuation application of U.S. patent application Ser. No. 10/231,371.

CLAIM OF BENEFIT TO PRIOR APPLICATION

This patent application claims the benefit of the U.S. Provisional Patent Application 60/383,140, and filed May 28, 2002.

FIELD OF INVENTION

The invention relates to titling. The invention also relates to method and apparatus for presenting computer-generated characters.

BACKGROUND OF INVENTION

Titling is a field of adding text to graphical images. Titling applications generate characters and associate the generated characters with graphical images. Such applications allow their users to apply effects to the characters. Current titlers require the user to input an associated set of characters (e.g., input one or more words) and then specify the effects for the set of characters. In order to apply the same effect on another set of characters, the user would have to re-specify the effects after entering the other set of characters. This approach is time consuming, as it does not allow users to reuse previously specified effects and store newly created effects for later use. It also makes it difficult to ensure that the same exact effect is applied to different sets of characters.

Current titlers and other applications use static fonts to display characters. Such static presentation is dull. Such presentation also does not satisfy the ever-increasing demand for creativity in graphical presentation of characters. Therefore, there is a need for a new method for presenting computer-generated characters. There is also a need for a new method for applying effects to character that is to be associated with graphical images.

SUMMARY OF THE INVENTION

Some embodiments of the invention provide a method for presenting computer-generated characters. The method defines several frames for a character and sequentially presents the frames. Each frame depicts a particular representation of the character. Also, at least two of the frames provide different representations of the character.

Some embodiments provide a method for applying effects to computer-generated characters. This method applies an effect to the computer-generated characters by first generating an effect script. It then selects the generated effect script to apply to the computer-generated characters.

BRIEF DESCRIPTION OF THE DRAWINGS

The novel features of the invention are set forth in the appended claims. However, for purpose of explanation, several embodiments of the invention are set forth in the following figures.

FIG. 4 illustrates an example of a character parameter override editing window for editing the individual character parameters.

FIG. 6 illustrates a character track and an effect script bar that affects the character track.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

I. OVERVIEW

Figure 1:
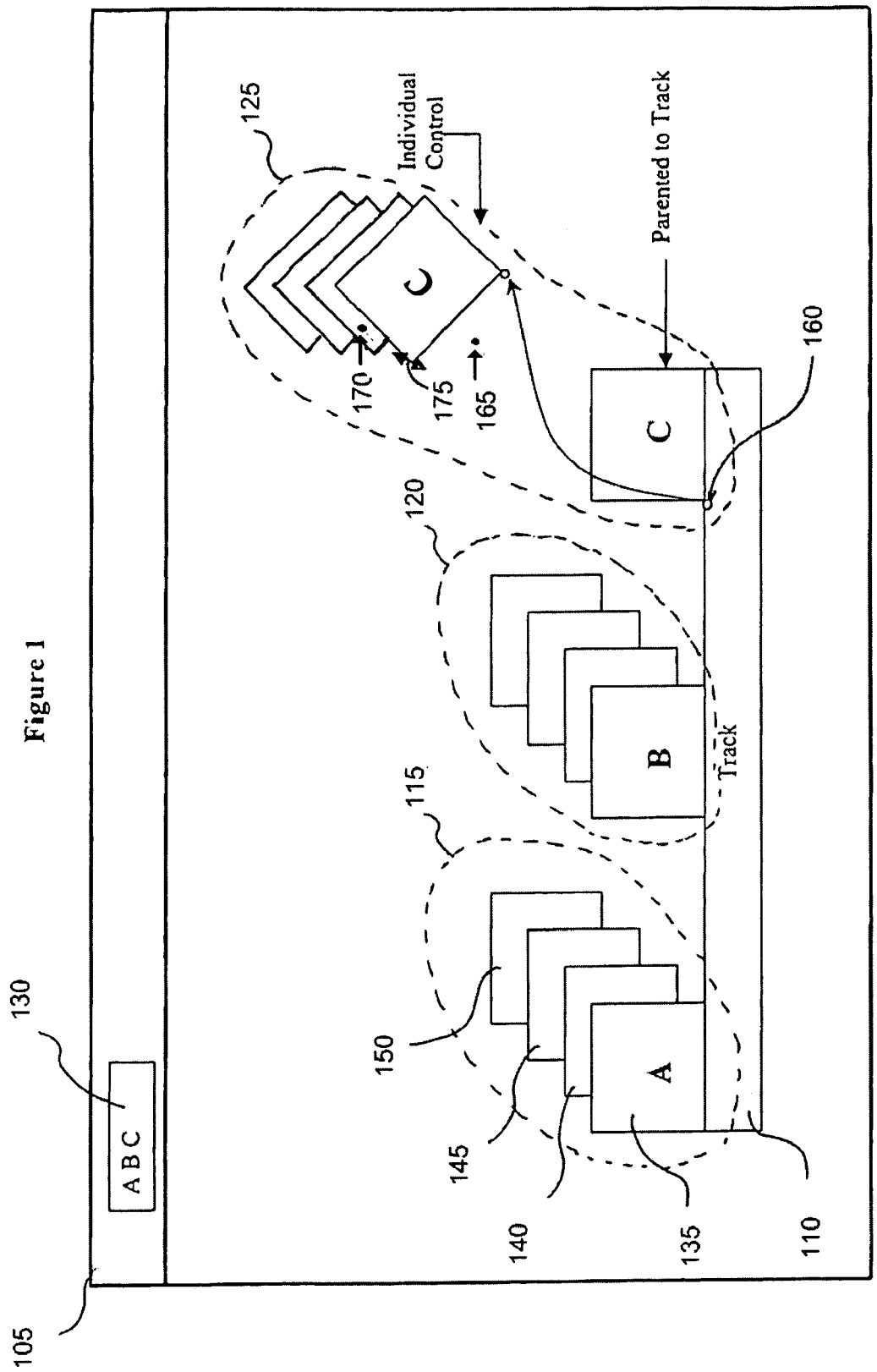
FIG. 1 illustrates a conceptual diagram of the graphical user interface.

FIG. 1 illustrates one embodiment of the invention. This figure presents a canvas 105 that includes a track 110 with several characters 115-125. Every character on the canvas 105 must reside on a track. The position of each character on a track is specified with respect to the track. Also, as further described below, any effect that is applied to the track is applied to each character on the track, although a character can be disassociated from the effects that are applied to its track. As further described below, some embodiments establish a parent-child relationship between a track and its characters, so that the track specifies the default position of, and the default effects for, its characters. A track is made of several control points to control its position and the position of its characters. Any number of tracks can be created on canvas 105.

In the embodiments described below, each character on the track 110 is independent of other characters on the track. Consequently, different visual effects can be applied to different characters on the same track. For instance, each character can be moved independently of the other characters. In this manner, characters on the same track can overlap one another. Also, different rotations can be applied to different characters on a track. For example, in FIG. 1, the character 125 is moved and rotated, while the characters 115 and 120 are not.

Characters can be inserted on a track by typing them in a text box 130, as illustrated in FIG. 1. Although this disclosure focuses upon alphanumeric characters, the character may be a letter, a symbol, a shape, or any other type of image. A multi-frame depiction can be used to represent each character. As conceptually illustrated in FIG. 1, a multi-frame depiction represents a character (e.g., character 115) with multiple frames (e.g., frames 135-150) that are to be displayed sequentially. Each frame in a character's multi-frame depiction provides a particular representation of the character and at least two of the frames provide different representation of the character. When the frames of a multi-frame character are devoid of any letter or symbol and only provide animated or picture images, the multi-frame depiction simply provides an animation or video presentation. However, when a character is a letter or a symbol, the multi-frame depiction serves as a multi-frame font for displaying the letter or the symbol.

Figure 2A:
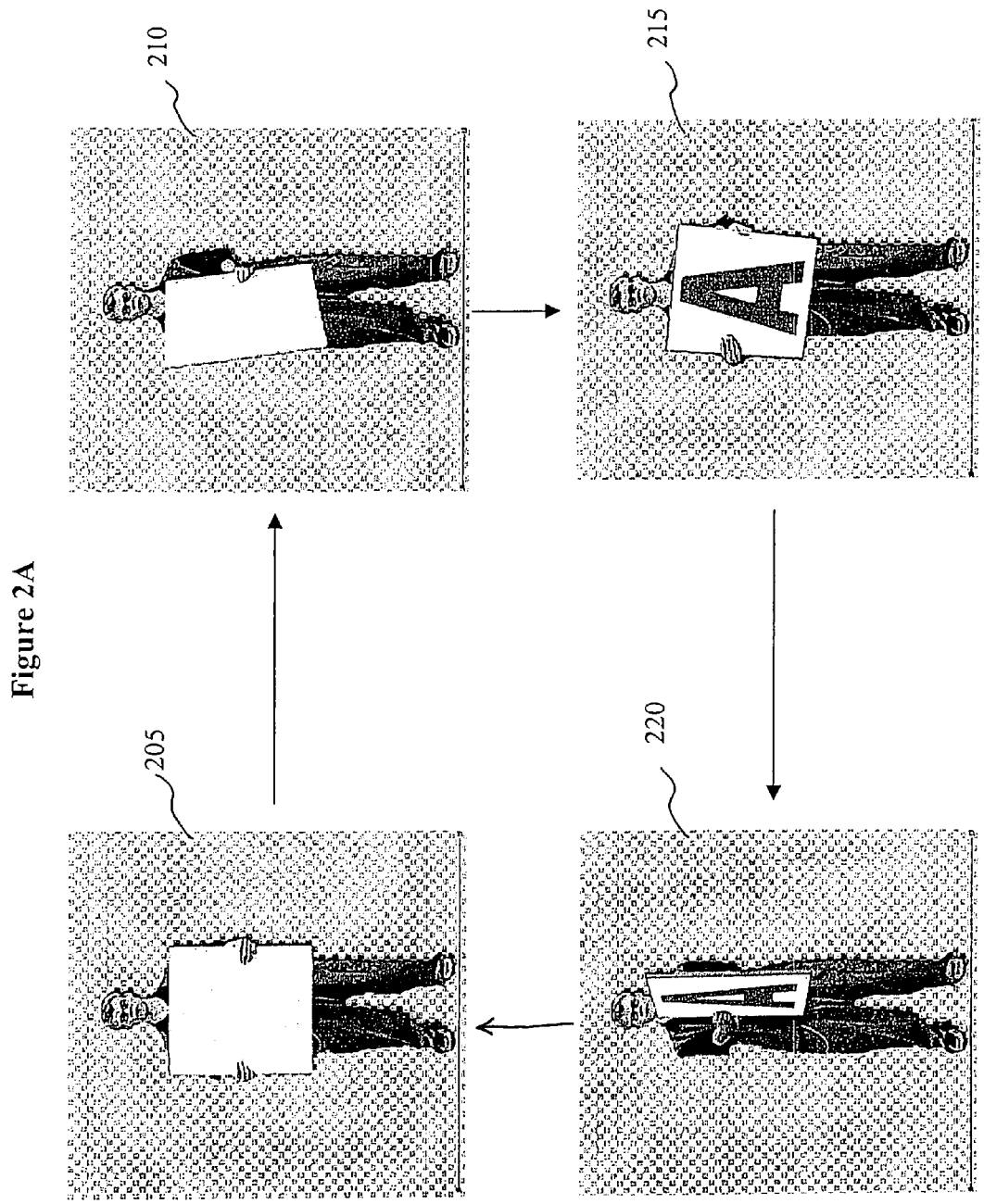
FIG. 2A illustrates a first example of a multi-frame font.

FIG. 2A illustrates one example of a multi-frame font. In this example, four frames represent each character. Each frame illustrates a man holding a card. In two of the frames 210 and 220, the man is holding the card sideways. In one frame 205, the man is holding the card in a position that exposes the blank backside of the card. In the other frame 215, the man is holding the card in a position that exposes the side on which the letter "A" is written. By displaying the frames in sequence, an animated presentation of the letter "A" is provided. This presentation shows a man repeatedly flipping a card that on one side has the letter "A" written on it. This presentation can be enhanced by using more than four frames to represent the font.

Figure 2B:
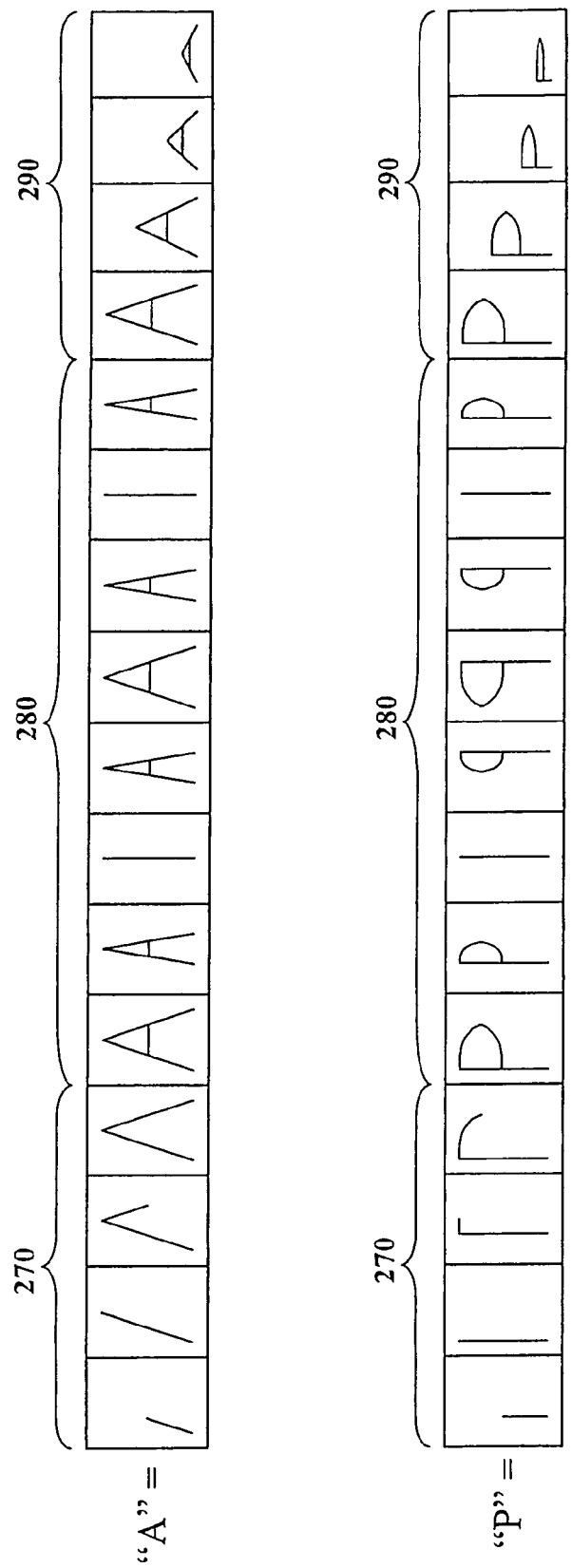
FIG. 2B illustrates a second example of a multi-frame font.

FIG. 2B illustrates a second example of a multi-frame font. The frames of a multi-frame font may be split into start frames, loop frames, and end frames. In this example, there are four start frames 270 for each character where the start frame shows the drawing of the characters. Next, there are eight loop frames 280 that show the character spinning. Finally, there are four end frames 290 that show the characters melting down to nothing. Note that all the multi-frame characters in the same multi-frame font must have the same number of frames for each character.

Referring back to FIG. 1, a user can apply one or more effects scripts to the track 110. Each effect script, in turn, is automatically applied to the characters 115-125 of the track. Generally, an effect script specifies one or more character parameters. Character parameters can specify a range of aspects for a character such as its position or rotation. Character parameters can also specify the visual presentation of the characters, such as opacity, blur, scale, glow, shadow, warp, etc.

In some embodiments, an effect script specifies two or more sets of character parameters, where each set is specified for a particular instance of time. In the discussion below, each set of character parameters at a particular time is called "a key frame." An example of three key frames of one effect script is listed below:

Key Frame 1
Time 0
Blur 20 0
Opacity 0
Scale 323.95045 301.15941
Offset 381 126
Key Frame 2
Time 0.38
Blur 20 0
Opacity 48.34237
Scale 275.44452 276.87516
Offset −164.67088 92.48102
Key Frame 3
Time 0.80
Blur 0 0
Opacity 100
Scale 323.95045 301.15941
Offset 381 126

Each key frame lists one or more character parameters and values for these parameters. In the above example, the three key frames are specified at times 0, 0.38, and 0.80. In these three key frames, the character parameters are blur, opacity, scale and offset, and values are specified for each of these parameters. During rendering, parameter values are interpolated from one key frame to another in order to apply an effect to a character. For instance, in the above example, the opacity value changes from 0 to 48.34237 and then to 100 at times 0, 0.38, and 0.8. Consequently, during rendering, opacity values between time interval 0 to 0.38 are derived by interpolating between 0 and 48.34237, and opacity values between 0.38 and 0.8 are derived by interpolating between 48.34237 and 100. During the interval 0 to 0.8, the opacity of the affected character is changed based on the key-frame and interpolated values.

For each track, a user can create an effect script. The embodiments described below also allow the user to specify one or more pre-tabulated effects scripts for the track. Pre-tabulated effect scripts are scripts that are created before the creation of the track. As further described below, some embodiments store pre-tabulated effect scripts in an effects library, which the user can access through a graphical user interface. From the effect library, a user can select any number of pre-tabulated scripts to apply to a track 110 and ultimately to its characters 115-125. A user can also modify the character parameters of a retrieved pre-tabulated effect script by (1) adding new key frames to the script, (2) modifying the values of the character parameters of the script's key frames, and (3) adding new character parameters to the key frames of the script. When the user adds a new character parameter to a key frame, the system automatically adds that character parameter to all the other key frames in the script. The user can then save modified effects scripts in the effect library as new scripts or as previously defined scripts. The embodiments described below also allow the user to modify pre-tabulated effect scripts and to store these scripts. In these embodiments, the user can also turn off an effect script for a character after specifying the effect script for the character's track.

These embodiments also allow the user to specify one or more character override parameters to an individual character on the track, since each character on a track is independent of the other characters. For instance, character 125 in FIG. 1 can be moved and rotated through a mouse operation that grabs a designated corner (e.g., lower left corner) of this character and drags it from position 160 to position 165, and a mouse operation that grabs a designated corner (e.g., upper left corner) of this character and rotates it from position 170 to 175.

II. One GUI Embodiment

Figure 3A:
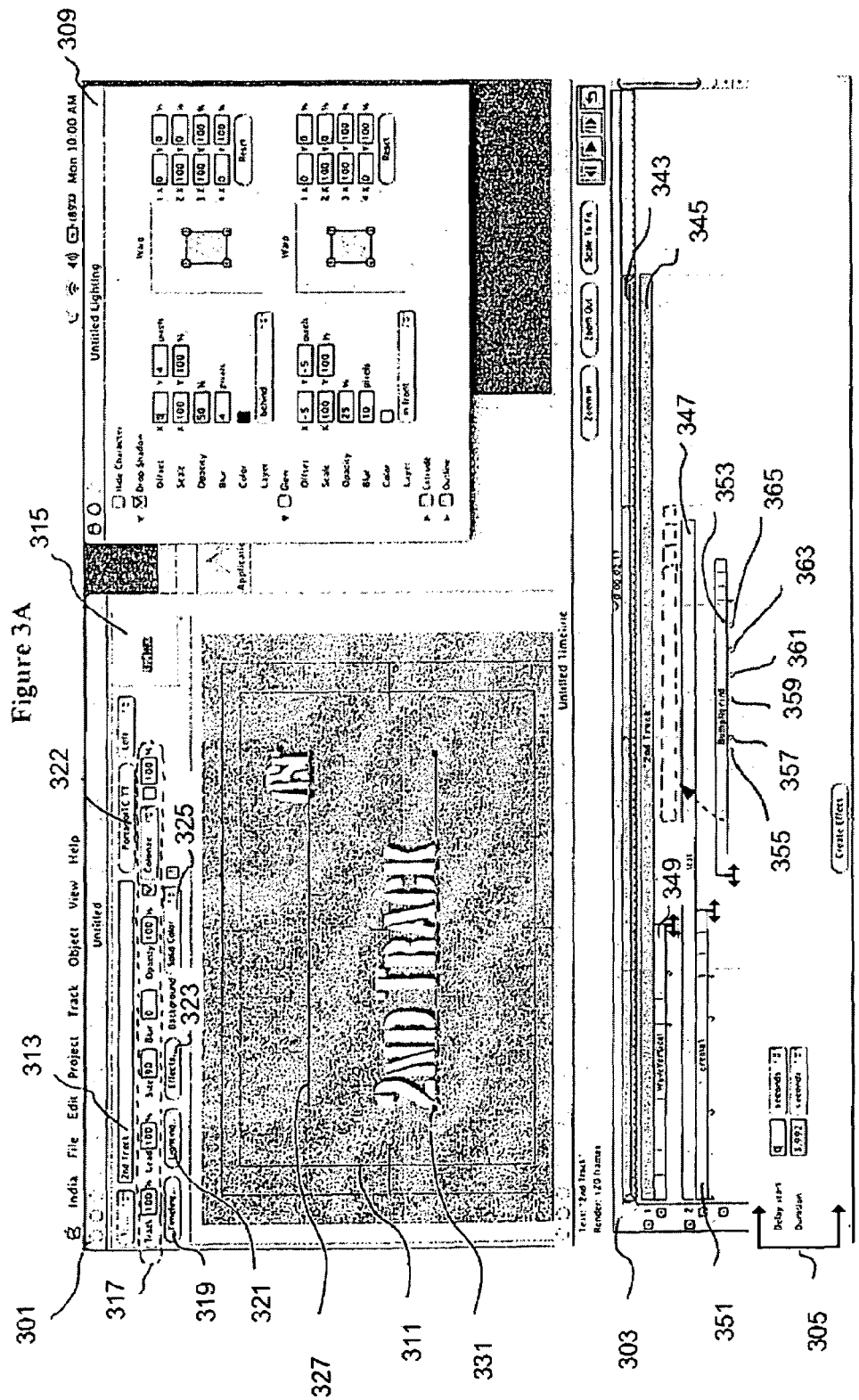
FIG. 3A illustrates a first example of a graphical user interface for a titling computer application program including a timeline window.
Figure 3B:
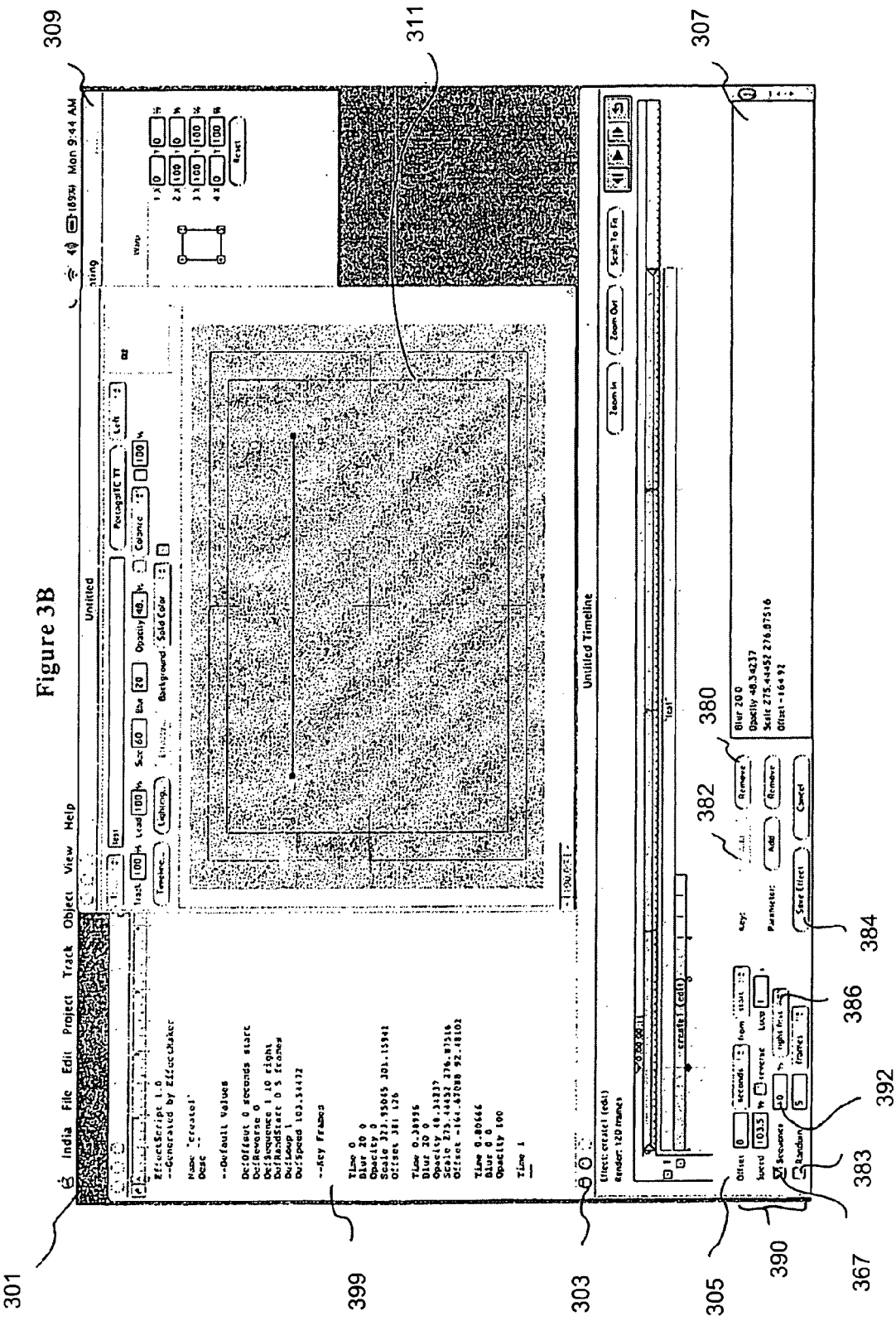
FIG. 3B illustrates a second example of a graphical user interface for a titling computer application program including a window for editing an effect script.

FIGS. 3A and 3B illustrates a more detailed embodiment of the invention. This figure presents a canvas window 301, timeline window 303, an effects-control window 305, parameter-display widow 307, a lighting window 309, and a preview pane 315. Canvas window 301 includes a canvas 311, text box 313, track character parameter controls 317, timeline button 319, lighting button 321, font selection button 322, effects button 323, and color selection button 325.

There are several methods of creating a track on the canvas 311. For instance, a user can create a track by selecting "Add Track" from the "Track" option in a menu bar. A user can also create a track by selecting a previously created track on the canvas, and then selecting "Duplicate Track" from the "Track" option in the menu bar. In addition, a user can create a track by pressing the enter key while the cursor is positioned on a canvas.

A track has to be selected in order to perform any number of operations on it. If a track is not selected, the user can select it through a click operation. Once the track is selected, the user can enter text or symbol characters for a track through the text box 313. A user can also enter objects as characters on a track through the "Object" option in the menu bar.

The track character parameter controls 317 allow the user to edit some of the character parameters that will affect all the characters on the track. In FIG. 3, these track character parameters 317 include blur, opacity, size, color, tracking percentage, and leading percentage. In other embodiments, character parameter controls can allow the user to enter other character parameters, such as XY offset, rotation, XY scale, texturizing, etc.

The user may select a character on a track and bring up a display window to edit the character parameters for the selected character. Editing the character parameters for a selected character overrides other parameters that one or more scripts might specify for the character. This editing is referred to as parameter 'override' editing. FIG. 4 illustrates an example of a parameter override editing window for editing the individual character parameters for a "T" character.

The timeline button 319 allows the user to pull up the timeline window 303, which is described below. The lighting button 321 allows the user to pull up the lighting window 309, which is also described below. The lighting window allows the user to modify parameters such as offset, scale, opacity, blur, warp, color, and layer for lighting effects such as hide character, drop shadow, glow, extrude, and outline. The font selection button 322 allows a user to open a font window, which presents the user with a menu of fonts. Some of the presented fonts are multi-frame fonts, such as the ones illustrated in FIGS. 2A and 2B. Other fonts may be system fonts such as TrueType fonts and Postscript fonts that only consist of a single frame.

Figure 5A:
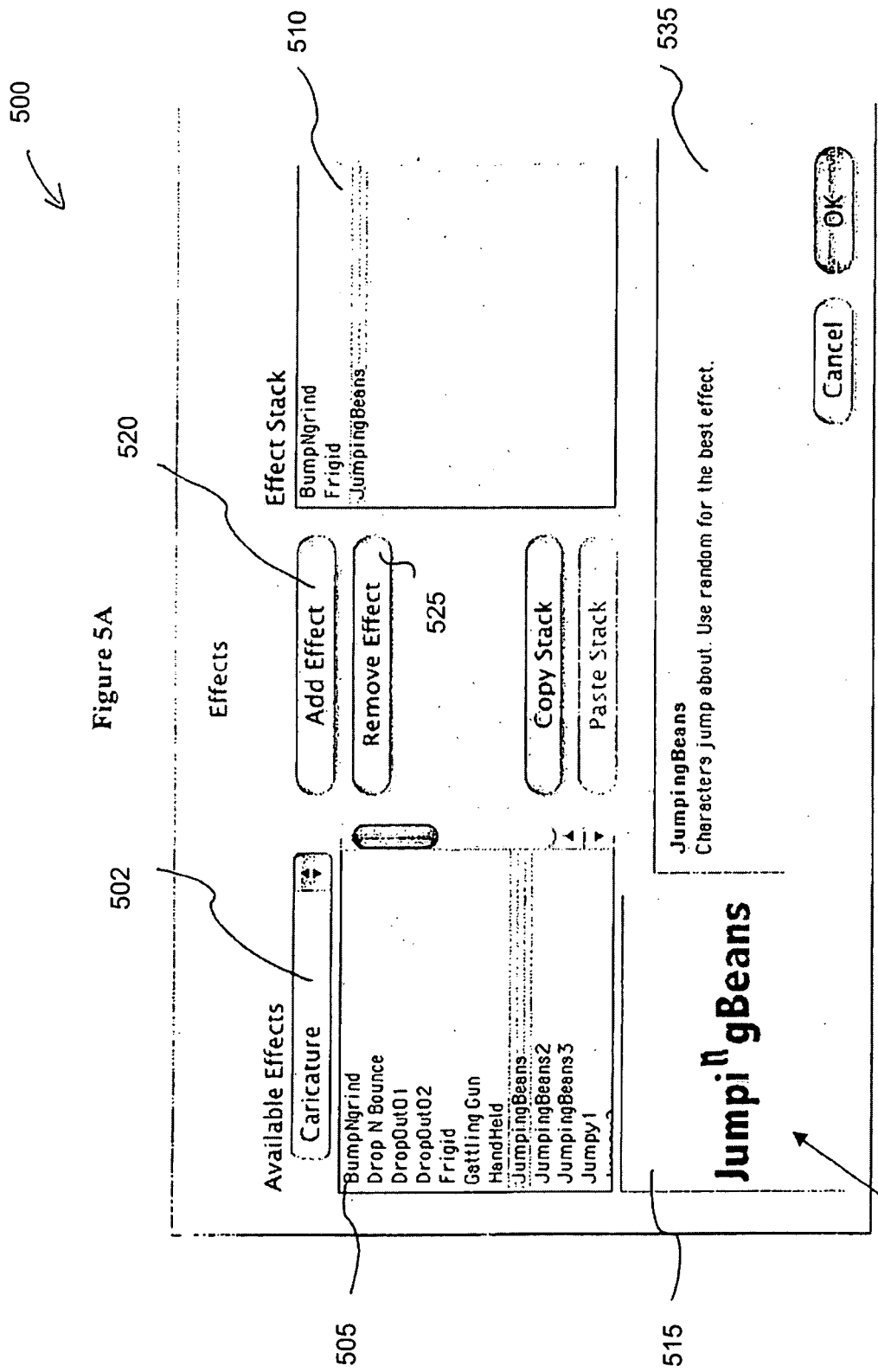
FIG. 5A illustrates a browser window that provides a library-selection window, an effect-script library, and an effect stack.

The effect button 323 allows a user to open a browser window that provides an effect-script library from which the user can select one or more pre-tabulated scripts to apply to a selected track. FIG. 5A illustrates a browser window 500 that provides a library-selection window 502, an effect-script library 505, and an effect stack 510. The library-selection window 502 pops open when selected to allow the user to select a particular effects library, where each effects library stores one or more effect scripts. In FIG. 5, the selected effect library is the "Caricature" library. Each effect library 505 includes a list of available effect scripts. The effect stack 510 lists the effect scripts that the user has picked for a selected track. In FIG. 5, BumpNgrind, Frigid, and JumpingBeans are three effect scripts that have been picked for a track. A user can add a script to the effect stack by selecting the script from the effect-script library 505 and clicking on the add effect button 520. Similarly, a user can remove a script from the effect stack 510 by selecting the script from the effect stack 510 and clicking on the remove effect button 525. The effect browser 500 also includes a preview display window 515, which provides a preview of an effect that is selected in the script library 505 and/or effect stack 510. The effect browser 500 further includes a description window 535 that provide a description of an effect that is selected in the script library 505 and/or effect stack 510.

Figure 5B:
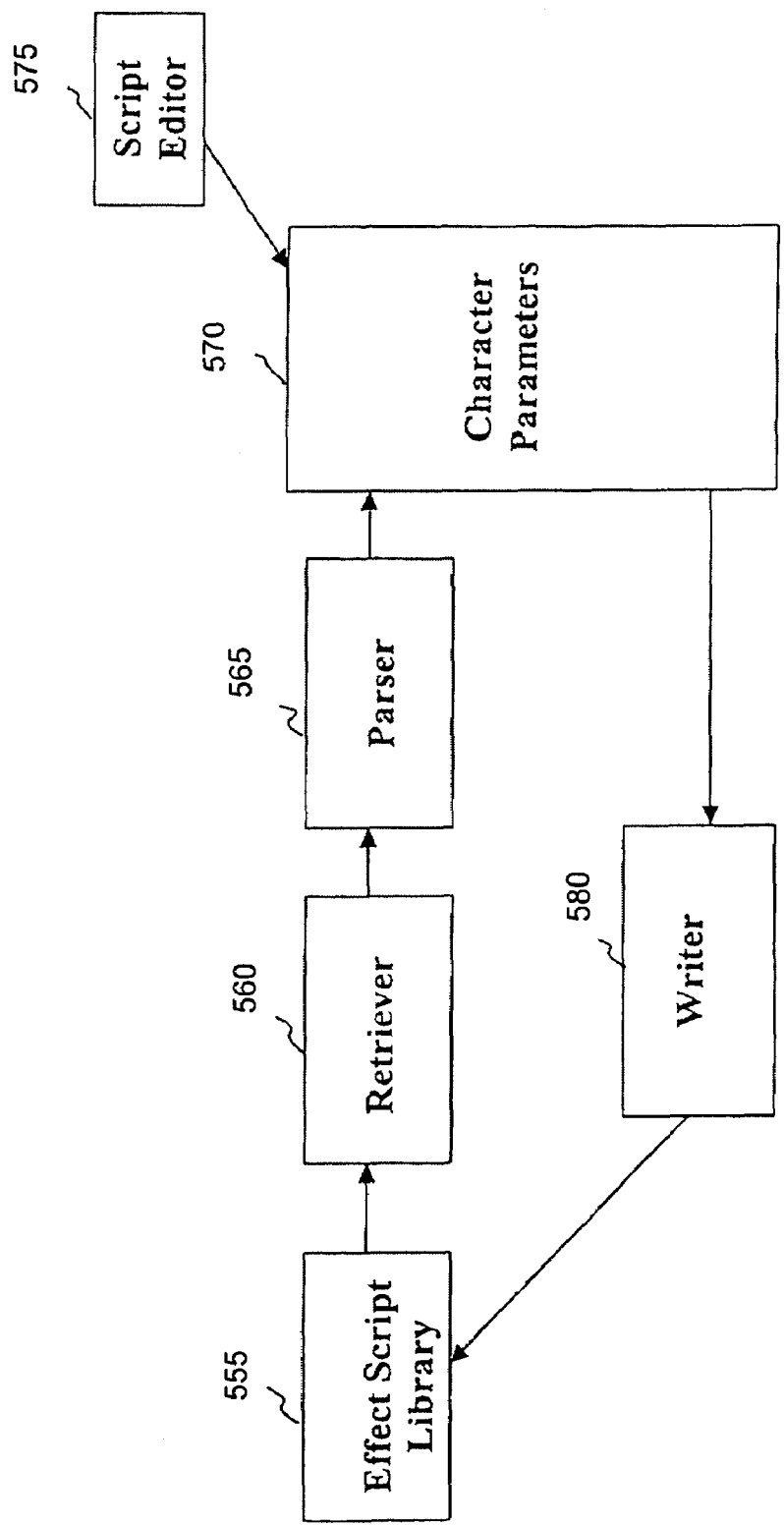
FIG. 5B illustrates a block diagram of some embodiments for creating, saving, and editing an effect script.

FIG. 5B illustrates a block diagram of some embodiments for creating, saving and editing an effect script. This figure presents an effects script library 555, a retriever 560, a parser 565, character parameter storage structure 570, script editor 575, and a writer 580. Effects library 555 includes several effect scripts for selection. The retriever 560 retrieves selected scripts from the effects library 555. The retrieved scripts are parsed by the parser 565.

The parser 565 includes a processing program that reformats the script parameters into individual character parameters. These character parameters are stored in the character parameter storage structure 570. A user can modify these character parameters (e.g. changing script parameter value) though the script editor 575. When the user directs the application to save as an effects script, the writer 580 reformats the character parameters that are stored in the structure 570, in order to create or recreate an effect script. As discussed above, an edited effect script can be stored as a new effect script or in place of a previously created effect script into the effects library 555.

Once pre-tabulated effect scripts are selected from the effect browser window 500, the selected scripts are pictorially represented by time bars in the timing window 303. FIG. 3A illustrates a timing window 303. This timing window 303 includes (1) a global time bar 343, (2) a time bar 345 for a first track 331 illustrated on canvas 311, (3) a time bar 347 for a second track 327 illustrated on canvas 311, (4) a time bar 349 for a 'WaveVertical' effect script that is selected for the first track 331, and (5) time bars 351 and 353 for 'Create1' and 'BumpNGrind' effect scripts that are selected for the second track 327. As shown in this figure, each effect bar is typically located under the time bar for its track.

Each time bar represents a temporal duration. The global time bar 343 represents the overall time period of the background presentation to which the tracks are being associated. Each track's time bar (345 or 347) represents the duration of time that the track is to be displayed over the background presentation. Each script time bar (349, 351, or 353) represents the duration of time that the effect script is to be applied to the track for which it is selected. The user can scroll through the global time bar. In addition, the user can move each track or script time bar by selecting the time bar and dragging it to its desired location. The user can also expand or contract each track or script time bar by dragging one of its sides. Once a user specifies a script for one track on the canvas, the user can quickly specify the script for another track on the canvas by dragging the scripts time bar to the other track's time bar. The dragging results in a copy of the script's time bar (349, 351, or 353) appearing below the other track's time bar.

Each script time bar (349, 351, or 353) includes key-frame markers that represent each scripts key frames. For instance, the key-frame markers of the BumpNGrind script 353 are markers 355-365 in FIG. 3A. When the user selects (e.g., clicks) on a key-frame marker, the user can view the character parameters of the marker's associated key frame. FIG. 3B illustrates a graphical user interface view of a user editing the second key frame for a 'create1' effect script. The character parameters for the second key frame are illustrated in window 307. A user may add a new character parameter or delete an existing character parameter by clicking the add or remove parameter buttons respectively. So long as a key frame is not one of the last two key frames of a script, its key-frame marker can be deleted through a key-remove key button 380 or through the keyboard's delete key.

An effect script can also be modified by adding new key frames to it. To do this, the user clicks a key-add button 382 that presents the user with a window through which the user can provide parameter values for the added key frame. The newly created key frame will include the same character parameters of the previously existing key frames of the selected effect script. When a key frame is added to a script, a new key-frame marker appears beneath the script's time bar at the temporal location of the added key frame.

As set forth above, a user can modify the character parameters in an effect script by selecting a key-frame marker of the script and modifying the character parameter values that appear in the parameter-display window 307. However, an effect script can also be modified with a graphical script-editing mode. To use the graphical script-editing mode, the user first selects a key frame from an effect script to edit, then the user selects a character that is controlled by that effect script and moves, scales, or rotates that character. The movement, scale adjustment, and rotation of that character will effect the offset character parameter, scale character parameter, and rotation character parameter for that key frame, respectively. Once an effect script has been modified, the user may save the modified effect script by clicking the save-effect button 384 and saving the modified effect script as a new effect script or saving over the previous effect script. Note, the effect scripts are stored as text files as illustrated in window 399 of FIG. 3B. A user may manually edit an effect script text with any text editor.

The user can expand or contract each effect script time bar (349, 351, or 353) by dragging one of its sides. When an effect script time bar (349, 351, or 353) expands or contracts, the key frames maintain their relative position next to one another. This is illustrated in FIG. 6 for the BumpNGrind script time bar for a track 640 that has four characters 645-660. This figure illustrates an original time bar 605 and an expanded time bar 610. As illustrated in this figure, the relative positions of the key-frame markers are the same in the time bars 605 and 610.

The preview pane 315 provides the user with immediate feedback of how effect parameters affect the characters of a selected track. The preview pane 315 will also provide the user with immediate feedback for some or all multi-frame presentations. This preview is provided without requiring the user to request rendering of the tracks. The presentation in the preview pane 315 is a live wireframe presentation that does not consume too much of the system resources.

One feature of the invention is the ability to "sequence" the frames of multi-frame characters on a track or the effect scripts applied to a track. Sequencing causes a delay between the selection of frames or the application of an effect script for the characters on a track. The first type sequencing is referred to as 'character sequencing' and the second type of sequencing is referred to as 'effect sequencing.'

Figure 3C:
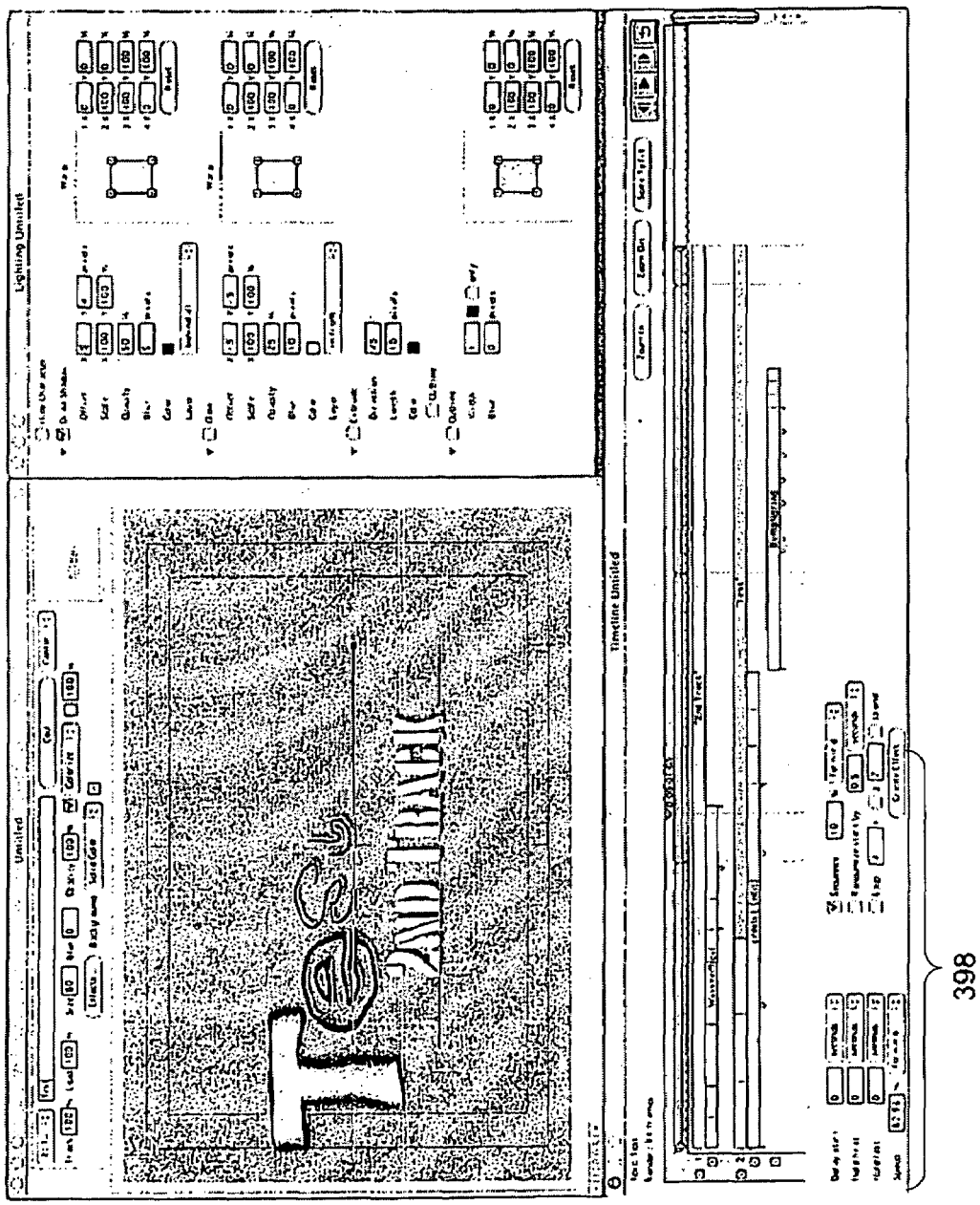
FIG. 3C illustrates a third example of a graphical user interface for a titling computer application program including a window for editing character sequencing.
Figure 7:
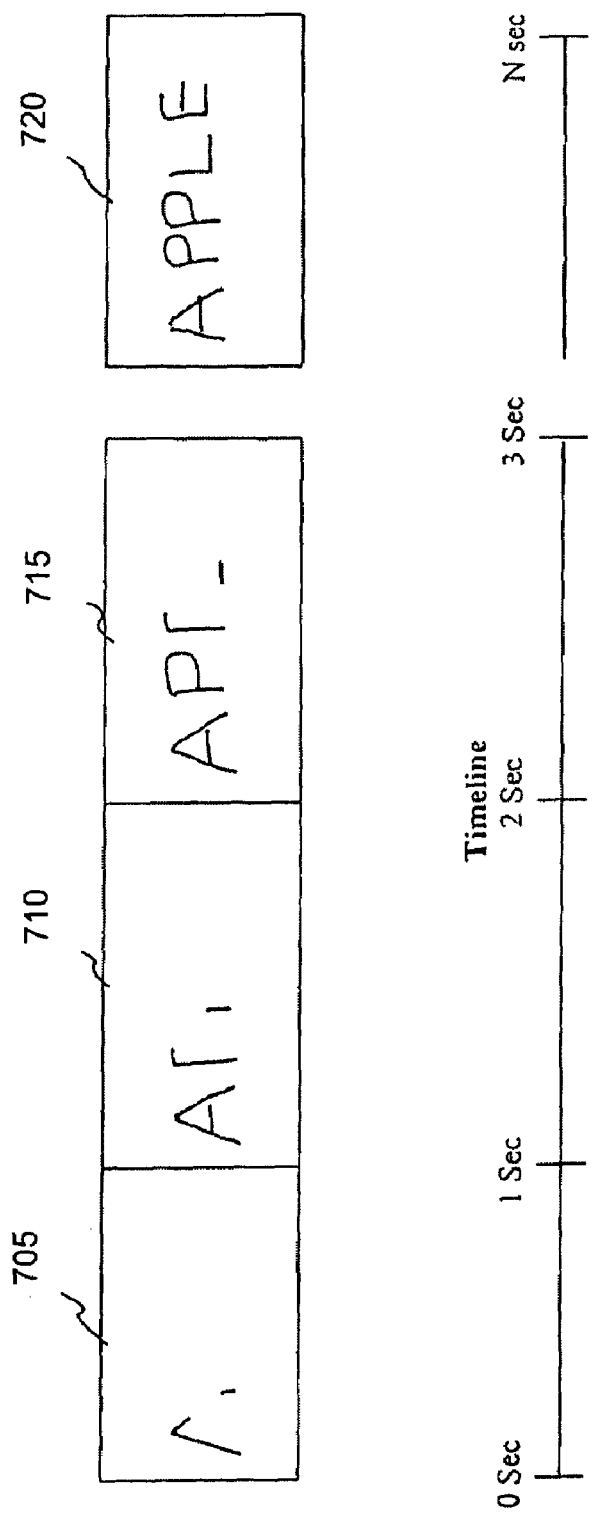
FIG. 7 graphically illustrates an example of sequencing of characters.

Character sequencing causes a delay between the selection of frames for the different characters on a track such that the characters do not progress through their frames in unison. FIG. 7 illustrates an example of Character sequencing. In the example of FIG. 7, the multi-frame font of FIG. 2B is used to represent each letter in the word "APPLE." This multi-frame font graphically writes out each letter in the start frames of the multi-frame font. In FIG. 7, character sequencing is applied at 50% in a left to right order such that frame selection starts with the leftmost letters. As illustrated in FIG. 7, the application starts to select frames for each successive character after 50% of the frames from the previous character have been rendered. FIG. 3C illustrates a graphical user interface with a set of character sequencing parameters 398 that may be set by the user Effect sequencing causes a delay between the application of an effect script to the characters on the same track. In this manner, an effect script will not affect all the characters on the track in unison. Instead, the effect script will first begin to affect a first character, then later begin to affect the next character, then later begin to effect the next character, and so on. When the effect completes for the first character, more time will be needed for the later characters. This time is illustrated as sequence boxes on an effect script bar. FIG. 6 illustrates an effect script bar 610 for a 'BumpNGrind' effect script that is being applied to a four character text track. The BumpNGrind effect script will end for the first character in the time depicted by the main box 615. Sequencing boxes 620, 625, and 630 represent the extra time needed to apply the effect script to the second, third, and fourth characters respectively due to the sequencing effect being on. Thus, each sequencing box pictorially represents the sequencing effect that is to be applied to the characters of the track to which the effect script is applied.

For example, the sequencing boxes may depict the BumpNGrind effect 610 is applied to the characters 645-660 on track 640 in a left to right sequence. After beginning to apply the effect script to the first character 645 of the track, the effect script is applied to each other character 650-660 in the sequence only after the effect has been applied to the previous character for a threshold amount of time. The preview pane 315 provides the user with immediate feedback of how sequencing affects the characters of a selected track.

FIG. 3B illustrates a graphical user interface with a set of effect script instance parameters 390 including the effect script sequencing controls. A user can turn the effect script sequencing option ON/OFF by checking/unchecking the effect sequence box 367. The user can also specify an effect script sequencing threshold percentage in box 392. To prevent the effect script sequencing from appearing completely mechanical, the user may select the random sequencing box 383 that causes the delay time to have a controlled random amount. The sequencing can be specified from left to right or right to left. The user can specify the order of the sequencing through an order-selecting menu 386.

Figure 8:
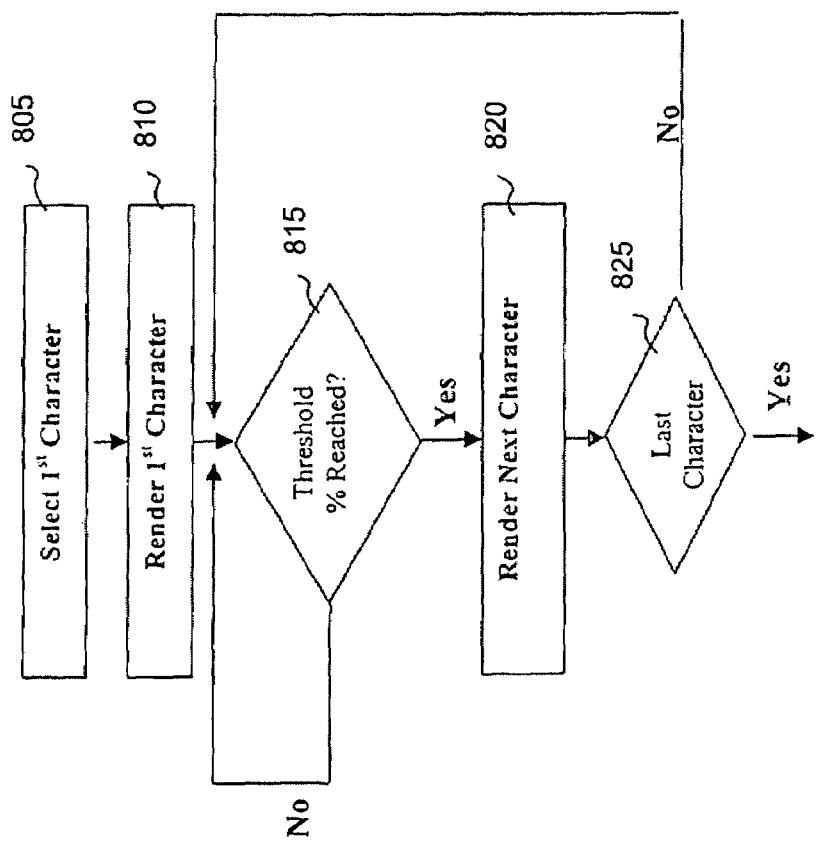
FIG. 8 provides a flow diagram that conceptually illustrates sequencing of characters on a track.

FIG. 8 provides a flow diagram 800 that conceptually illustrates non-randomized sequential rendering of characters on a track. This process initially selects (at 805) a first character on the track according to a rendering order specified by the user. It then starts to render (at 810) the first character on the track. Next, the process determines (at 815) whether it has completed a specified threshold amount of the last selected character's rendering. This threshold amount can be any percentage specified in box 392, which is illustrated in FIG. 3B.

Once the process determines (at 815) that it has completed the specified threshold amount of the last selected character's rendering, the process starts (at 820) to select the next character on the track in the specified rendering order. The process then determines (at 825) whether it has selected all the characters on the track. If so, the process ends; otherwise, the process transitions to 815. In this manner, the process 800 repeats until the rendering of the last character has been started.

III. Architecture

Figure 9:
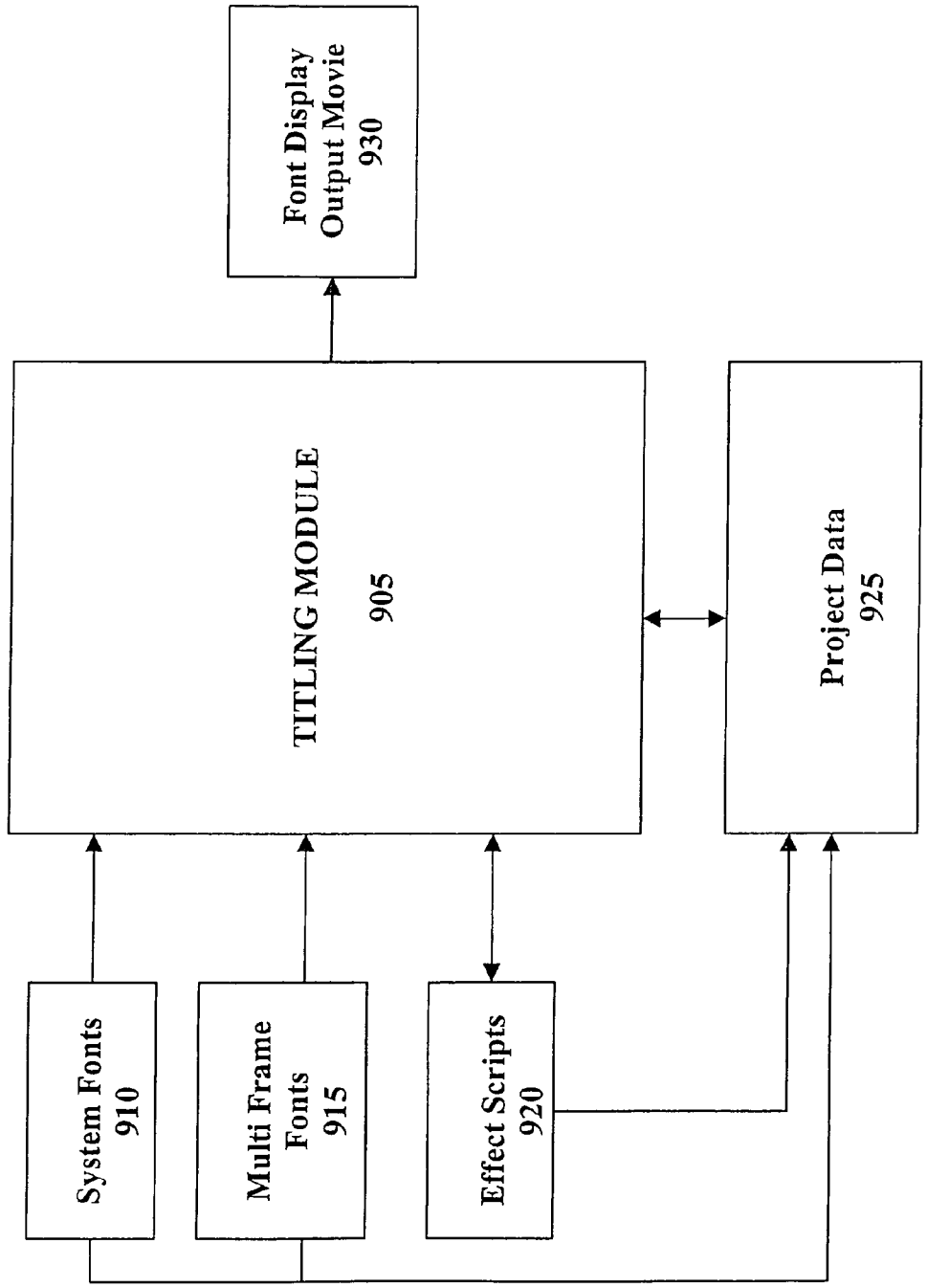
FIG. 9 illustrates an architectural block diagram of the titling system of the present invention.

FIG. 9 illustrates an architectural block diagram of the titling system of the present invention. The main program code of the titling system of the present invention resides in the main titling module 905. As illustrated in FIG. 9, the main titling module 905 accesses a number of different data sources to create an animated title display. Specifically, the main titling module 905 accesses multi-frame fonts 915, system fonts 910, and effect scripts 920 in order to create project data 925 that defines a titling project. When a user is satisfied with the titling project, the user may then request the main titling module 905 to process the created project data 925 in order to render a multi-frame font display output movie 930.

A. Multi-Frame Font Data

As previously set forth, the main type of data used by the main titling module 905 is a set of multi-frame fonts 915. The multi-frame fonts 915 are a collection of characters (also known as characters) wherein each character is one or more image frames. The multi-frame fonts 915 include the image frames for each character and associated data that define certain parameters of the characters. In one embodiment, the data for each multi-frame font is stored in pair files known as an Active Font Data file (AFD file) and Active Font Proxy (AFP file). The AFP file includes the image data for a single frame of each character and all the parameter data that specifically define the various characters. The parameter data may include the size, color, the anchor point, the number of frames, the start frame, the loop frame, and the end frame. The AFD file is a larger file with the remaining frames for each character. These two files provide the Titling module 905 with the raw multi-frame font information that will be used for creating a titling project.

Figure 10:
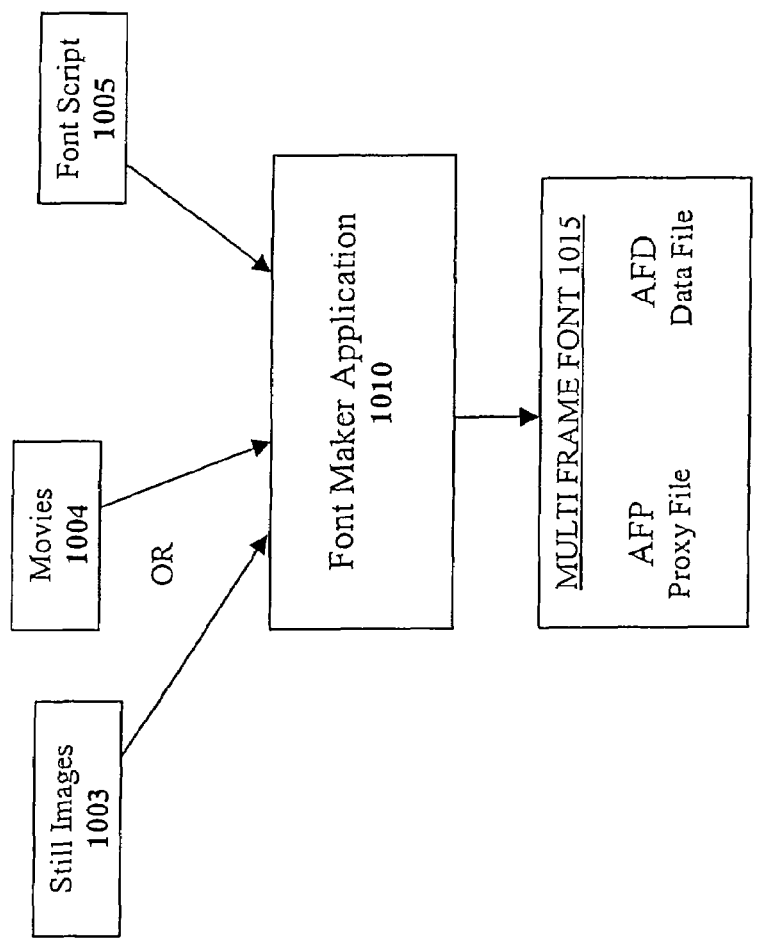
FIG. 10 conceptually illustrates how a font maker application program may be used to create a multi frame font.

FIG. 10 conceptually illustrates how a multi-frame font may be created. Referring to FIG. 10, a font maker application 1010 is used to generate a multi-frame font 1015. The font maker application 1010 creates fonts by reading in a specially formatted font script 1005 in conjunction with still images or movie files. The font maker application 1010 parses the commands in the font script that define the specific parameter data for the various characters such as the character size, the anchor point, the number of frames, the start frame, the loop frame, and the end frame, etc. The font maker application 1010 then outputs the multi-frame font 1015. As previously set forth, the multi-frame font 1015 may comprise an AFD file and an AFP file. The font maker application 1010 may also include several other features such as an error correction capability to locate and correct reported errors in the font script 1005.

The still images used by the font maker application 1010 may be any hand drawn or computer-generated image files. Several still images may be used as long as at least two images are distinct from each other and show some type of a progressive movement. Alternatively, identical still images may also be used to show no movement.

The movie files used by the font maker application 1010 may originate from any QuickTime video, MPEG video, AVI video, or any other known movie format that matches the file formats accept by the font maker application 1010. For any particular multi-frame font, all the movie files should include the same number of frames. In a preferred embodiment, the movies files are divided into three different sets of frames: start frames, loop frames, and end frames. The start frames define the beginning of the character, the loop frames define animated loop frames for the character, and the end frames define the end of the character. For example, for a multi-frame font of flaming characters, the start frames define the beginning flame up frames of each character, the loop frames define an animated loop of frames for each character burning, and the end frames define a series of frames where the flames on each character die out.

The font script 1005 comprises a specially formatted text file that specifies the needed character parameter information needed to generate a multi-frame font 1015. For example, the font script 1005 would list the start frames, loop frames, and end frames for the characters in the fonts. The font script 1005 text file may be composed with any text editor such as BBEdit Lite, Claris Works, or Microsoft Word. The font script 1005 may also allow a user to define key strokes on a keyboard for each corresponding movie. In one embodiment of the font script 1005, any sequence of two dashes ('--') in a font script 1005 is called a comment delimiter. Any text that follows a comment delimiter in a line is a comment, and is ignored by font maker 1010. The following table describes the formatting of one embodiment of a font script 1005:

fontname string

The string parameter specifies the name of the font, which will appear in the ActiveFont popup menu in the Control Pane of the ActiveFont Titler application.

dataname string

The string parameter specifies the name of the new Active-Font Data file that will be created when this FontScript is processed. For Windows compatibility, this name should end with ".afd".

proxyname string

The string parameter specifies the name of the ActiveFont Proxy file that will be created when this FontScript is processed. For Windows compatibility, this name should end with ".afp".

proxymovie string

The string parameter specifies the name of the QuickTime movie that will be used as the thumbnail movie for the font. This movie file will be copied into the Proxy file, and will be used by ActiveFont Titler's "Browse ActiveFonts" dialog.

cdname string

The string parameter specifies the name of the CD-ROM that will contain the ActiveFont Data file. This name will be presented to the user when he is asked to insert the CD-ROM in order to render a movie.

dvdname string

The string parameter specifies the name of the DVD-ROM that will contain the ActiveFont Data file. This name will be presented to the user when he is asked to insert the DVD-ROM in order to render a movie. This command is optional, and defaults to flavor word The word parameter specifies the "flavor" of the ActiveFont, and may be ActiveFont, Texture, or Object. These words can be abbreviated, because only the first character in the word is significant.

desc string

The string parameter provides an English description of the ActiveFont.

lowerleft integer integer

The two integer parameters specify the x and y position of the lower-left corner of the characters in their source movies.

This point is used as the character anchor point by ActiveFont Titler. These coordinates are given as offsets from the lower-left corner of the canvas (i.e. of the source movies).

center integer integer

The two integer parameters specify the x and y position of the default rotation axis point characters. These coordinates are given as offsets from the lower-left corner of the canvas (i.e. of the source movies). Characters may optionally specify their center point and lowerleft point, but if they do not, the default values are used.

fontsize integer

The integer parameter specifies the native height of the font in pixels. This height is used by ActiveFont Titler to determine how much it must scale when the user specifies a target font size.

spacewidth integer

The integer parameter specifies the width of the space character (and any characters that do not exist in this font) in pixels.

monowidth integer

The integer parameter specifies the width in pixels that is to be used for all characters when the user selects "monospace" tracking.

blankfirstframe integer

The integer parameter specifies whether or not FontMaker should generate a blank first frame for each character. A value of 0 means it will not; 1 means it will. The introframes, loopframes, and endframes values should take this blank frame into account. This command is optional, if missing, its value is assumed to be 0.

blanklastframe integer

The integer parameter specifies whether or not FontMaker should generate a blank last frame for each character. A value of 0 means it will not; 1 means it will. The introframes, loopframes, and endframes values should take this blank frame into account. This command is optional, if missing, its value is assumed to be 0.

canloop integer

The integer parameter specifies whether or not the font can be looped. A value of 0 means it cannot; 1 means it can.

introframes integer

The integer parameter specifies the number of frames in the "Intro" part of the font.

loopframes integer

The integer parameter specifies the number of frames in the "Loop" part of the font.

endframes integer

The integer parameter specifies the number of frames in the "End" part of the font.

rgbquality float

The float parameter specifies the quality at which to compress RGB character frames. The value should be between 0.0 and 1.0. This command is optional. If it is not present, a default value of 0.8 is used.

alphaquality float

The float parameter specifies the quality at which to compress the Alpha channel of character frames. The value should be between 0.0 and 1.0. This command is optional. If it is not present, a default value of 0.95 is used.

framerate float

The float parameter specifies the number of frames per second in the source character movies. aspect float The float parameter specifies the pixel aspect ratio of the source character movies. Use 1.0 for square-pixel, 0.9 for NTSC D1, and 1.066667 for PAL D1.

defaultsize float

The float parameter specifies the default Size for the font.

defaultkerning word

The word parameter is the default Kerning type, and may be Monospaced or Proportional.

defaultjustify word

The word parameter is the default text Justification, and may be Left, Center, or Right.

defaultoutline integer float integer integer integer integer

The first integer parameter is 0 for OFF, or 1 for ON.

The float parameter is the outline width in pixels.

The next three integer parameters are the RGB color.

The final integer parameter is OutlineOnly, and may be 0 for OFF, or 1 for ON.

defaultblur float

The float parameter specifies the blur radius, in pixels.

defaultopacity float

The float parameter specifies the opacity percentage.

defaultsurface integer word integer integer integer

The first integer parameter is 0 for OFF, or 1 for ON.

The next word parameter is Colorize or Matte.

The next three integer parameters are the RGB color.

defaultshadow integer float float float float float float integer integer integer integer The first integer parameter is 0 for OFF, or 1 for ON.

The next two float parameters are the shadow X and Y offset, in pixels.

The next two float parameters are the shadow X and Y scale percentages.

The next float parameter is the shadow opacity percentage.

The next float parameter is the shadow blur radius, in pixels.

The next three integer parameters are the shadow RGB color.

The next integer parameter is Layer, and may be 0 for Behind All, 1 for Behind, 2 for Front, or 3 for Front Only.

defaultglow integer float float float float float float integer integer integer integer This command is optional. If it is not present, default values are used.

The first integer parameter is 0 for OFF, or 1 for ON.

The next two float parameters are the glow X and Y offset, in pixels.

The next two float parameters are the glow X and Y scale percentages.

The next float parameter is the glow opacity percentage.

The next float parameter is the glow blur radius, in pixels.

The next three integer parameters are the glow RGB color.

The next integer parameter is Layer, and may be 0 for Behind All, 1 for Behind, 2 for Front, or 3 for Front Only.

defaultextrude integer float float float float float float integer integer integer integer This command is optional. If it is not present, default values are used.

The first integer parameter is 0 for OFF, or 1 for ON.

The next float parameter is the extrude direction, expressed in clockwise degrees from upward.

The next float parameter is the extrusion length, in pixels.

The next three integer parameters are the extrusion RGB color.

The next integer parameter says whether or not to outline the extrusion: 0 for OFF, or 1 for ON.

defaultholdfirst float word

The first float parameter specifies the hold-first value. The final word parameter specifies the units, and may be Frames or Seconds.

defaultholdlast float word

The first float parameter specifies the hold-last value. The final word parameter specifies the units, and may be Frames or Seconds.

defaultloop integer integer

The first integer parameter is 0 for OFF, or 1 for ON. The final word parameter specifies the units, and may be Frames or Seconds.

defaultrandomloop integer integer

The first integer parameter is 0 for OFF, or 1 for ON. The final integer parameter is the random loop value.

defaultsequence integer float word

The first integer parameter is 0 for OFF, or 1 for ON. The next float parameter is the sequence percentage. The final word parameter specifies the direction, and may be Forward, Reverse, or Ping-pong.

defaultrandomstart integer float word

The first integer parameter is 0 for OFF, or 1 for ON. The next float parameter is the random-start value. The final word parameter specifies the units, and may be Frames or Seconds.

character string integer integer {integer integer integer integer}

The character command describes a single character in the font. The first string parameter is a list of characters that are represented by this character. The second string specifies the name of a QuickTime movie that represents this character. The third parameter is an integer that specifies the width in pixels of the character at the default fontsize. The fourth parameter is an integer that specifies which frame in the movie is to be used as the proxy.

The frame number is zero-based, so for example if the third frame is to be used as the proxy, you would use the number 2 for this parameter. It is possible to use a proxy image that is not actually in the character's intro, loop, or end, by just appending the proxy frame to the end of your character's source movie. The final four integer parameters are optional. If they are included, then they represent an (x,y) coordinate that will be used to override the global coordinate specified by the lowerleft command, and an (x,y) coordinate that will be used to override the global coordinate specified by the center command.

To more fully disclose the operation of the font script 1005, the following listing provides an example font script 1005 for creating a multi-frame font according to the teachings of the present invention. Note that in the font script listing, any text after a pair of dashes ("--") is a comment.

--A Fontscript for a 'numbers' font fontname "Numbers"

dataname "Numbers.afd"

proxyname "Numbers.afp"

proxymovie "numbersproxy.mov" -- 160×120 source movie for thumbnail cdname "DVF_03"

dvdname "India Fonts DVD 1"

flavor ActiveFont desc "This is an example of an ActiveFont. I hope it helps."

lowerleft 10 10 -- 10,10 from lower-left center 100 50 -- default character rotation axis point spacewidth 80 monowidth 100 fontsize 210 canloop 0 blankfirstframe 0 blanklastframe 0

FontScript Specification 1.4 page 5 of 6 introframes 5 loopframes 15 endframes 5 rgbquality 0.75 alphaquality 0.9 framerate 29.97 aspect 0.9

-- Default values defaultsize 80 defaultkerning mono -- monospaced defaultjustify center -- center defaultoutline 0 2 30 30 30 1 -- don't outline, width=2, dark gray, not Only defaultblur 2.5 -- blur 2.5 pixels defaultopacity 90 -- opacity 90% defaultsurface 1 Color 0 255 0 -- do colorize green defaultshadow 1 5 5 100 100 7.5 0 0 0 1 -- do shadow, offset (5,5), -- scale (100%,100%), radius 7.5 pixels, -- black, behind this textLine defaultglow 1 −2 −2 100 100 10 255 255 255 3 -- do glow, offset (5,5), -- scale (100%,100%), radius 10 pixels, -- white, matted in front of this textline defaultextrude 0 135 10 0 255 0 0 -- no extrusion, 135° 10-pixels long, -- solid green, no outline defaultholdfirst 3 F -- hold first frame for 3 frames defaultholdlast 0 sec -- hold-last frame for 0 seconds defaultloop 1 3 -- do loop, 3× defaultrandomloop 1 2 -- do random loop, ±2× defaultsequence 0 50 fwd -- don't sequence, 50%, forward defaultrandomstart 0 10 frames -- don't do random start, ±10 frames -- Characters character "0" "0.mov" 100 0 character "1" "1.mov" 100 0 character "2" "2.mov" 100 0 character "3" "3.mov" 100 0 character "4" "4.mov" 100 0 character "5" "5.mov" 100 0 character "6" "6.mov" 100 0 character "7" "7.mov" 100 0 character "8" "8.mov" 100 0 character "9" "9.mov" 100 0

—This next character is a box that will be used for any letter character "ABCDEFGHIJKLMNOPQRSTUVWXYZabcdefghijklmnopqrstuvwxyz" "box.mov" 80 0 character "[{<(" "leftparen.mov" 50 0 15 5 25 50 -- note optional params character "]}>)" "rightparen.mov" 50 0 15 5 25 50 character " " "singlequote.mov" 30 0 character " " "doublequote.mov" 45 0

The multi-frame font output files from the font maker application 1010 in one embodiment are the AFP file and an AFD file. The AFP file is a relatively small file that contains a binary description of the font, a little thumbnail movie used to preview the font in the Title Module's "Browse ActiveFonts" dialog, and a single compressed proxy frame for each character in the font. AFP proxy file also includes more detail specification of the font such as, location of the pivot points, anchor points, # of frames in the movie etc. Thus by selecting one frame as a proxy frame, one may include all the specification information. The AFD file contains information of all the rest of the frames but not the specification such as Pivot points etc. The AFP file is needed to define positioning on the canvas and aid in the design process. The AFD file is needed to render all of the font frames. Specifically, the AFD file is used in conjunction with the AFP file that includes the specification parameter to render the font images for the remainder of frames.

In one embodiment, the AFP and AFD files store the font images as compressed color JPEG images. Each color JPEG image is accompanied by an eight-bit depth gray-scale image that specifies an 'alpha channel' that describes the image's level of transparency. However, many other types of image storage formats could be used.

B. System Font Data

Referring back to FIG. 9, in addition to the multi-frame fonts, the main titling module 905 allows the user to use standard system fonts 910 from the computer system. The system fonts are used as fonts that have a single image frame. Specific information about the systems fonts needed by the main titling module 905 can be read from the system font file such as the TrueType font file or the Postscript Font file.

C. Effect Scripts

For animating characters, the main titling module 905 of the present invention uses effect scripts. As previously set forth, each effect script defines at least two different key frames. Each key frame defines a set of parameters for the character such as opacity, offset, rotation, shadow, etc. The main titling module 905 will interpolate the frames in between the defined key frames. To provide maximum flexibility, the titling module 905 may perform non-linear interpolations.

Effect scripts are applied to the entire track. However, the user may select a character and have that character 'opt out' of an effect such that the effect script will not affect that single character on the track. Specifically, FIG. 4 illustrates a character parameter editing window wherein the user may uncheck the box next to the effect script name in the window 450.

When an effect script is being applied to an entire track, "sequencing" may be used such that the effect starts for a first character, then waits a predefined amount of time before being applied to the second character, then waits a predefined amount of time before being applied to the third character, and so on. The amount of time between each character may be specified as a percentage of the effect length. Furthermore, the amount of time may be randomized so the characters do not appear to move completely in unison.

As set forth earlier, effect scripts may be created with the graphical user interface (GUI) of the titling module of the present invention. In one embodiment, the effect scripts are stored as text representations such that an advanced user that does not wish to use the graphical user interface can easily modify the effect scripts with any text editor.

To fully describe the effect scripts, one possible implementation will be provided. However, note that the effect scripts may be implemented in many different forms with additional parameters. In one embodiment of the effect scripts, the following commands should appear at the beginning of an effect script text files.

| | |
|---|---|
| EffectScript 1.0 | The EffectScript Spec version number. Use 1.0. |
| Name "effect name" | Put your own effect name in there. Quotes can be any non-space delimiter (", ', /, etc.). |
| Desc "description" | Put your description in there. This may be a long string; will be wrapped around when displayed, but not too long because it will not be scrollable. |
| Default values: | |

| | -continued |
|---|---|
| DefOffset a b c | a is numeric value |
| | b is %, Seconds, or Frames |
| | c is Start or End |
| DefSequence a b c | a is 0 for OFF or 1 for ON |
| | b is numeric % value, may be floating point |
| | c is L for left-first, or R for right-first |
| DefRandStart a b c | a is 0 for OFF or 1 for ON |
| | b is numeric value, may be floating point |
| | c is %, Seconds, or Frames |
| DefLoop a | a is numeric value, must be integer |
| | (use a large number like 9999 to loop forever) |
| DefSpeed a | a is numeric % value, may be floating point |

After the above header, the effect script contains a number of "Time blocks." Each Time Block defines a key frame for the effect. A Time block starts with a TIME command, and is followed by some number of Parameter commands. For example, here is a Time block:

Time 0.0
Scale 50
Track −50

The preceding Time block defines a key frame at time ZERO, where the titling module will scale each character by 50%, and adjust its tracking by −50%. The first Time block (key frame) starts at time 0.0, and there must be at least one other Time block (key frame) after that first Time block. All Time blocks in the effect script must be listed in temporally sequential order. In one embodiment, the following character parameter commands are valid in a Time block:

| | |
|---|---|
| Color r g b [n] | r, g, and b are color values, in [0...255] |
| | n is optional, and is an opacity % |
| Outline n | n is the pixel width of the outline |
| SetOutlineColor r g b | r, g, and b are the outline color, in [0...255] |
| SetOutlineOnly n | n is 0 for NO or 1 for YES |
| SetOutlineWarp x1 y1 x2 y2 x3 y3 x4 y4 | x,y pairs are the four points in the Warp |
| Blur x [y] | x is the blur radius in pixels. If y is given, then the X and Y blur amounts are distinct |
| Opacity n | n is the opacity percent. This will be multiplied by the character's opacity |
| Matte n | n is 0 or 1 for OFF or ON |
| Tracking n | n is a % by which to adjust the next character (e.g. use −100 to put the next character atop this one, or 0 to leave it unchanged, or 100 to double it) |
| Scale x y | x and y are the X and Y scale percent multipliers |
| Rotate n | n is the rotation angle, in CW degrees |
| Offset x y | x and y are the X and Y offsets, in pixels |
| CurveOffset n | n is the curve offset, in percent |
| HideChar n | n is 0 for Show the character in addition to lighting effects, 1 to Hide it |
| DoShadow n | n is 0 for NO or 1 for YES |
| ShadOpacity n | n is the shadow opacity percent |
| ShadOffset x y | x and y are the shadow offsets in pixels |
| ShadScale x y | x and y are the shadow scale percent |
| ShadBlur n | n is the shadow blur radius in pixels |
| ShadColor r g b | r, g, and b are the shadow color, in [0...255] |
| ShadWarp x1 y1 x2 y2 x3 y3 x4 y4 | x,y pairs are the four points in the Warp |
| ShadLayer n | n is 0 for behind all, 1 is behind textline, 2 is in front, 3 is in front matted to character |
| DoGlow n | n is 0 for NO or 1 for YES |
| GlowOpacity n | n is the glow opacity percent |
| GlowOffset x y | x and y are the glow offsets in pixels |
| GlowScale x y | x and y are the glow scale percent |
| GlowBlur n | n is the glow blur radius in pixels |
| GlowColor r g b | r, g, and b are the glow color, in [0...255] |
| GlowWarp x1 y1 x2 y2 x3 y3 x4 y4 | x,y pairs are the four points in the Warp |
| GlowLayer n | n is 0 for behind all, 1 is behind textline, 2 is in front, 3 is in front matted to character |
| DoExtrude n | x is 0 for no extrusion, 1 for extrude |
| ExtrudeDirection n | n is an angle in degrees, 0 = up, 90 = right, etc. |
| ExtrudeLength n | n is extrusion length in pixels |
| ExtrudeColor r g b | r, g, and b are the extrusion color, in [0...255] |
| ExtrudeOutline n | n is 0 for no outline, 1 to outline extrusion |

To more fully describe one embodiment of the effect scripts, several example effect scripts are provided. The following effect script 'zooms in' on the displayed characters by increasing the character's scale from 0 to 100 percent:

| EffectScript 1.0 |
|---|
| -- "Zoom In" example |
| Name "Zoom In" |
| Desc "Zoom In each character linearly from zero to normal from its anchor point. Simultaneously increase the kerning from zero to normal." |
| DefOffset 0 % Start |
| DefSequence 0 0 L |
| DefRandStart 0 0 % |
| DefLoop 1 |
| DefSpeed 100 |
| Time 0.0 |
|    Tracking -100   -- -100% tracking, means zero tracking. |
|    Scale 0 0   -- 0% scale |
| Time 2.0 |
|    Tracking 0   --0% tracking, means normal. |
|    Scale 100 100   -- 100% scale. |

The following effect script performs the opposite of the preceding effect script. Specifically, the following effect script 'zooms out' from the displayed characters by decreasing the character's scale from 100 to 0 percent:

| EffectScript 1.0 |
|---|
| -- "Zoom Out" example |
| Name "Zoom Out" |
| Desc "Zoom Out each character linearly from normal to zero from its anchor point. Simultaneously decrease the kerning from normal to zero." |
| DefOffset 0 % End |
| DefSequence 0 0 L |
| DefRandStart 0 0 % |
| DefLoop 1 |
| DefSpeed 105 |
| Time 0.0 |
|    Tracking 0 |
|    Scale 100 100 |
| Time 2.0 |
|    Tracking -100 |
|    Scale 0 0 |

This final effect script example simultaneously rotates the character while changing the character's color. This script uses four Time Blocks (key frames) to define the effect:

| EffectScript 1.0 |
|---|
| -- "Tinted Rotate" example |
| Name "Tinted Rotate" |
| Desc "Rotate each character around its anchor point at 1 rev/sec. For fun, simultaneously mess around with the color" |

```
                        -continued
                       EffectScript 1.0

DefOffset 0 % Start
    DefSequence 0 0 L
    DefRandStart 1 100 %
    -- note large loopCount so that it will loop through the whole
    duration.
    DefLoop 9999
    DefSpeed 100
    Time 0
        Color 255 0 0 -- Tint Red (R=255, G=0, B=0)
        Rotate 0
    Time 1
        Color 0 255 0 -- Tint Green (R=0, G=255, B=0)
        Rotate 120
    Time 2
        Color 0 0 255 -- Tint Blur (R=0, G=0, B=255)
        Rotate 240
    Time 3
        Color 255 0 0 -- Tint Red (R=255, G=0, B=0)
        Rotate 0
    -- Note: When interpolating values, effects always move toward the
    -- next value in the shortest direction. So here we had to use three
    -- rotation amounts rather than just 0 and 180 degrees, or the direction
    -- of rotation would have been indeterminate.
```

As set forth in the graphical user interface discussion, a user may modify an existing effect script for a particular project. The modified effect script is stored within the project data 925. The user may also save the modified effect script as a new effect script. When the user saves a modified effect script as a new effect script, the titling module 905 saves the effect into the library of effect scripts 915.

D. Project Data

Referring again to FIG. 9, when a user creates a title project, the titling module 905 stores all the project data that defines the titling project into a titling project data 925 file. The project data 925 file stores all the information necessary to render a title project video. The project data 925 file may refer to system fonts 910 used by the titling project, multi-frame fonts 915 used by the titling project, and effect scripts 920 used by the titling project.

Figure 11:
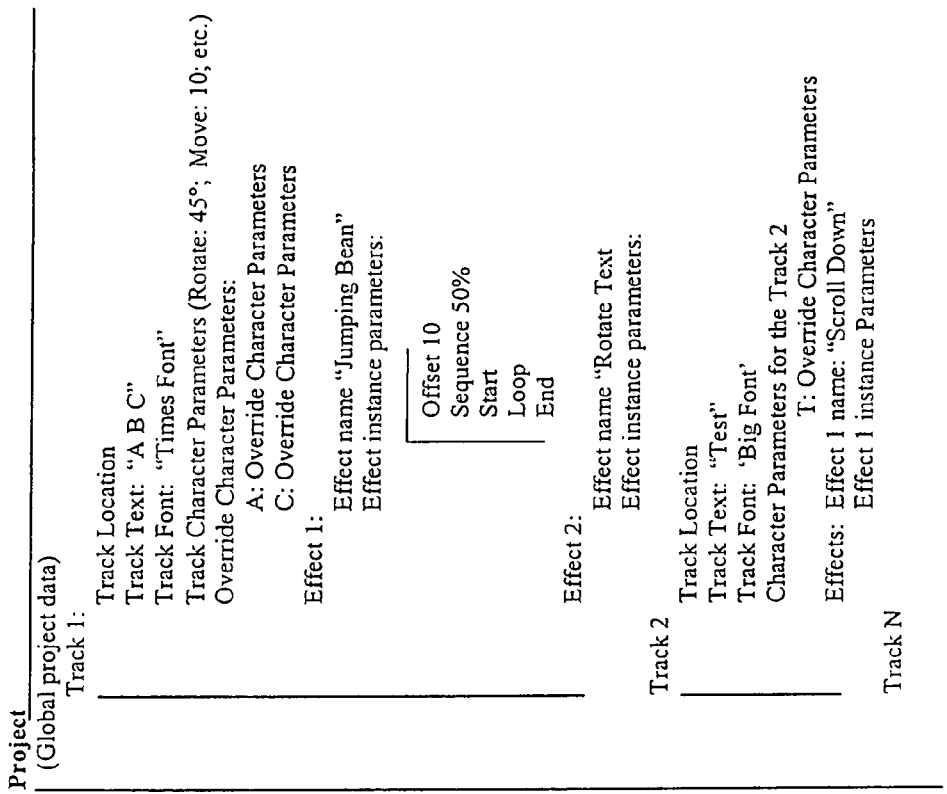
FIG. 11 conceptually illustrates the information stored by the project data file of the titling system of the present invention.

FIG. 11 conceptually illustrates the information stored by the project data 925 file. Referring to FIG. 11, a titling project is made up of global project data and one or more 'tracks' as set forth the earlier graphical user interface description. The global project data 925 file contains certain information about the title project such as the display resolution, the frame rate, whether that output will be interlaced for full-frame, etc.

The tracks define lines of characters that may be animated. Multiple tracks may be created for each project. Each track is independent of the other tracks in the project. The project data 925 file contains a large amount of information for each track.

The first three items of information are the track location, the track text, and the track font. The track location defines the location on the screen where the track text will reside. In a preferred embodiment, the track location is defined as a Bezier curve on the canvas display. In this manner the text tracks are not limited to being straight lines. The track text defines the actually characters (or characters) that will be displayed on the track. The first track of FIG. 11, track 1, specifies the text "ABC". Finally, the track font defines the font that will be used to render the track text. The font may be a standard system font 910 or one of the new multi-frame fonts 915. Note that the selected font for the track must include characters for the selected track text. (Not all fonts will include all characters.)

After the track location, the track text, and the track font, the project data 925 file specifies a set of track character parameters (color, scale, rotate, opacity, etc.) for the track. The track character parameters will be the default character parameters for all the characters in the track. The track character parameters in the project data 925 correspond to the track character parameter controls 317 of FIG. 3A.

Referring back to FIG. 11, after the track character parameters, the track may include a set of override character parameters. For each character in the track that will be rendered a little different than the other characters, the override character parameters specify those differences. In track 1 of FIG. 11, characters "A" and "C" have over-ridden character parameters that will cause characters "A" and "C" to be rendered differently than the other characters on the track. FIG. 4 illustrates a window that displays the set of character override parameters for one possible embodiment.

Finally, the project data 925 file defines a set of effects for the track. Each effect applied to the track has a name and a set of effect instance parameters. The effect name defines which effect from the library of effect scripts 915 is being used. The effect instance parameters define exactly how the effect will be applied to the track. The effect instance parameters specify when the effect will begin (its offset), if sequencing will be used, how the sequencing will be used, how long the effect will last, how many times the effect will loop, etc. FIG. 3B illustrates a set of effect instance parameters for one possible embodiment.

The project data example of FIG. 11 includes a second track, track 2. Track 2 displays the text "Test" with a font named "Big Font." A single effect, "Scroll Down," is applied to the track 2.

E. Titling Project Rendering

Once a user has completed their titling project, the user can request the main titling module 905 to render a movie of the titling project. The main titling module 905 then processes all the information in the project data 925 file and outputs a series of video frames or fields for the titling project. The video frames or fields for the titling project may be output in a variety of different formats.

Figure 12:
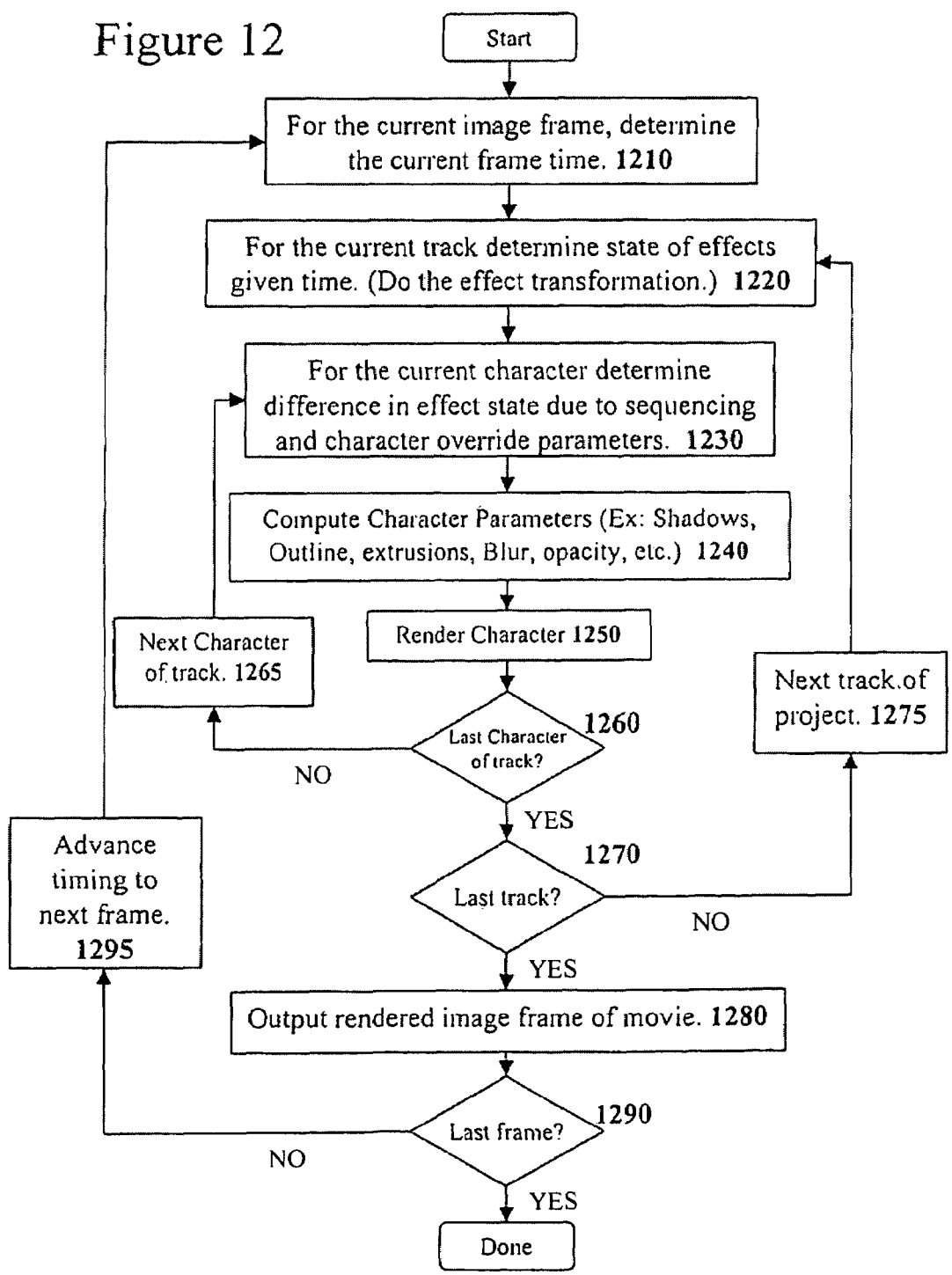
FIG. 12 illustrates a flow diagram that describes how the titling system of the present invention renders the final series of video frames or fields for the titling project.

FIG. 12 illustrates a flow diagram that describes how the main titling module 905 creates the final series of video frames or fields for the titling project. Initially, at step 1210, the system determines the current frame time. Different frame rates for different video systems may cause the time to advance different amounts between each frame.

Next, at step 1220, the system begins to examine each track in the project. The system must determine the state of each effect being applied to the track. Then, the system considers begins to consider each character on the track at step 1230. For each character, the system determines the effects applied to that character and any character over-ride parameters.

Finally, at step 1240, the system computes a final set of character parameters for that character by considering track character parameters, character over-ride parameters, and changes made by active effect scripts on the character. The character is then rendered in step 1250. At step 1260, the systems tests to see if that character is the last character on the track. If not, the system advances to the next character at step 1265 and returns to step 1230 to handle the next character on the track.

If the character was the last character on the track at step 1260, then the system advances to step 1270 to determine if it is the last track in the project. If it is not the last track of the project, then the system proceeds to step 1275 to advance to the next track and returns to step 1220 to begin rendering that next track.

If the track was the last track of the project at step 1270, then the system proceeds to output the final image frame for the current frame time at step 1280. At step 1290, the system determines if that frame was the last frame of the rendered movie sequence. If the frame was not the last frame, the system transitions to step 1295, where it advances the timing to the next frame, and then returns to 1210 to begin rendering the next image frame of the rendered movie sequence.

IV. Computer System

Figure 13:
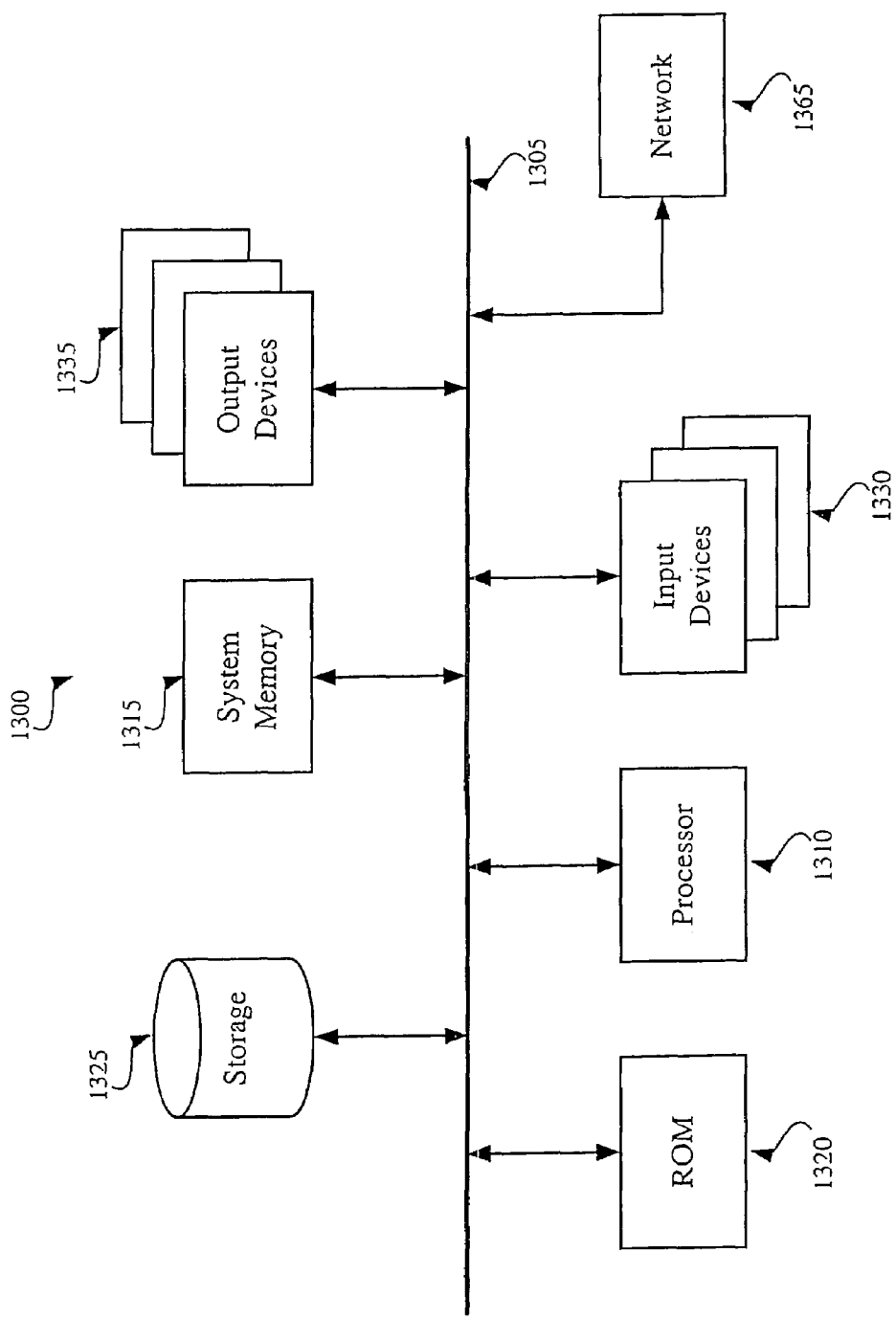
FIG. 13 illustrates a computer system with which one embodiment of the invention is implemented.

FIG. 13 presents a computer system with which one embodiment of the present invention is implemented. Computer system 1300 includes a bus 1305, a processor 1310, a system memory 1315, a read-only memory 1320, a permanent storage device 1325, input devices 1330, and output devices 1335.

The bus 1305 collectively represents all system, peripheral, and chipset buses that communicatively connect the numerous internal devices of the computer system 1300. For instance, the bus 1305 communicatively connects the processor 1310 with the read-only memory 1320, the system memory 1315, and the permanent storage device 1325.

From these various memory units, the processor 1310 retrieves instructions to execute and data to process in order to execute the processes of the invention. The read-only-memory (ROM) 1320 stores static data and instructions that are needed by the processor 1310 and other modules of the computer system. The permanent storage device 1325, on the other hand, is read-and-write memory device. This device is a non-volatile memory unit that stores instruction and data even when the computer system 1300 is off. Some embodiments of the invention use a mass-storage device (such as a magnetic or optical disk and its corresponding disk drive) as the permanent storage device 1325. Other embodiments use a removable storage device (such as a floppy disk or Zip® disk, and its corresponding disk drive) as the permanent storage device. Like the permanent storage device 1325, the system memory 1315 is a read-and-write memory device. However, unlike storage device 1325, the system memory is a volatile read-and-write memory, such as a random access memory. The system memory stores some of the instructions and data that the processor needs at runtime. In some embodiments, the invention's processes are stored in the system memory 1315, the permanent storage device 1325, and/or the read-only memory 1320.

The bus 1305 also connects to the input and output devices 1330 and 1335. The input devices enable the user to communicate information and select commands to the computer system. The input devices 1330 include alphanumeric keyboards and cursor-controllers. The output devices 1335 display images generated by the computer system. For instance, these devices display IC design layouts. The output devices include printers and display devices, such as cathode ray tubes (CRT) or liquid crystal displays (LCD).

Finally, as shown in FIG. 13, bus 1305 also couples computer 1300 to a network 1365 through a network adapter (not shown). In this manner, the computer can be a part of a network of computers (such as a local area network ("LAN"), a wide area network ("WAN"), or an Intranet) or a network of networks (such as the Internet). Any or all of the components of computer system 1300 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method of presenting computer-generated characters, the method comprising:
    for a first character and a second character, receiving a selection of a multi-frame font, said multi-frame font providing (i) a first plurality of frames for the first character and (ii) a second plurality of frames for the second character, each frame providing a particular representation of a character, wherein at least two frames for a particular character provide a different representation of the particular character;
    starting a display of the first plurality of frames for the first character; and
    after a time delay from the start of the display of the first plurality of frames for the first character, starting a display of the second plurality of frames for the second character.

2. The method of claim 1, wherein one of the first and second characters is a letter.

3. The method of claim 1, wherein one of the first and second characters is a symbol.

4. The method of claim 1, wherein one of the first and second characters is a number.

5. The method of claim 1, wherein the first plurality of frames is stored in a plurality of files, wherein at least one file comprises image data specifying the parameters of one frame of the first character and at least one file comprises image data specifying the parameters for the remainder of the first plurality of frames.

6. The method of claim 5, wherein the plurality of files comprises data related to size of the first character.

7. The method of claim 5, wherein the plurality of files comprises data related to blur of the first character.

8. The method of claim 5, wherein the plurality of files comprises data related to opacity of the first character.

9. The method of claim 5, wherein the plurality of files comprises data related to color of the first character.

10. The method of claim 5, wherein the plurality of files comprises data related to tracking and leading of the first character.

11. The method of claim 1, wherein the first plurality of frames comprises at least a first set of frames and a second set of frames.

12. The method of claim 11, wherein the second set of frames is for sequential display more than once when the first plurality of frames is displayed.

13. The method of claim 12, wherein the first set of frames is for sequential display before the display of the second set of frames.

14. The method of claim 13, wherein the first plurality of frames further comprises a third set of frames, wherein the third set of frames is for sequential display after the display of the second set of frames.

15. A computer readable medium storing a computer program for presenting computer-generated characters, the computer program executable by at least one processor, the computer program comprising a set of instructions for:
    receiving, for a first character and a second character, a selection of a multi-frame font, said multi-frame font providing (i) a first plurality of frames for the first character and (ii) a second plurality of frames for the second character, each frame providing a particular representation of a character, wherein at least two frames for a particular character provide a different representation of the particular character;
    starting a display of the first plurality of frames for the first character; and after a time delay from the start of the display of the first plurality of frames for the first character, starting a display of the second plurality of frames for the second character.

16. The computer readable medium of claim 15, wherein the first plurality of frames comprises at least a first set of frames and a second set of frames, wherein the second set of frames is for sequential display more than once when the first plurality of frames is displayed.

17. The computer readable medium of claim 16, wherein the first set of frames is for sequential display before the display of the second set of frames, wherein the first plurality of frames further comprises a third set of frames, wherein the third set of frames is for sequential display after the display of the second set of frames.

18. An apparatus comprising:

at least one processor for executing sets of instructions; and a memory that stores a computer program for presenting computer-generated characters, the computer program comprising sets of instructions for:

receiving, for a first character and a second character, a selection of a multi-frame font, said multi-frame font providing (i) a first plurality of frames for the first character and (ii) a second plurality of frames for the second character, each frame providing a particular representation of a character, wherein at least two frames for a particular character provide a different representation of the particular character;

starting a display of the first plurality of frames for the first character; and after a time delay from the start of the display of the first plurality of frames for the first character, starting a display of the second plurality of frames for the second character.

19. The apparatus of claim 18, wherein the first plurality of frames is stored in a plurality of files, wherein at least one file comprises image data specifying the parameters of one frame of the first character and at least one file comprises image data specifying the parameters for the remainder of the first plurality of frames.

\* \* \* \* \*

UNITED STATES PATENT AND TRADEMARK OFFICE
CERTIFICATE OF CORRECTION

PATENT NO.        : 7,594,180 B1                     Page 1 of 1
APPLICATION NO. : 10/842581
DATED             : September 22, 2009
INVENTOR(S)       : Langmacher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 729 days.

Signed and Sealed this

Twenty-eighth Day of September, 2010

David J. Kappos
*Director of the United States Patent and Trademark Office*